US010185957B2

(12) United States Patent
Quigley et al.

(10) Patent No.: US 10,185,957 B2
(45) Date of Patent: Jan. 22, 2019

(54) SOFTWARE PIN ENTRY

(71) Applicant: Square, Inc., San Francisco, CA (US)

(72) Inventors: Oliver S. C. Quigley, San Francisco, CA (US); Nathan McCauley, San Francisco, CA (US); Bob Lee, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 492 days.

(21) Appl. No.: 13/800,610

(22) Filed: Mar. 13, 2013

(65) Prior Publication Data

US 2013/0332367 A1 Dec. 12, 2013

Related U.S. Application Data

(60) Provisional application No. 61/658,828, filed on Jun. 12, 2012.

(51) Int. Cl.
*G06Q 20/40* (2012.01)
*G06Q 20/36* (2012.01)
(Continued)

(52) U.S. Cl.
CPC ......... *G06Q 20/4012* (2013.01); *G06F 21/35* (2013.01); *G06Q 20/3226* (2013.01);
(Continued)

(58) Field of Classification Search
CPC .............................. G06Q 20/32; G06Q 20/20
See application file for complete search history.

(56) References Cited

U.S. PATENT DOCUMENTS

| 5,815,083 A | 9/1998 | Patarin et al. |
| 5,903,652 A * | 5/1999 | Mital ............... G06Q 20/04 705/26.25 |

(Continued)

FOREIGN PATENT DOCUMENTS

| AU | 2018201016 A1 | 3/2018 |
| CA | 2 919 655 A1 | 2/2015 |

(Continued)

OTHER PUBLICATIONS

U.S. Appl. No. 14/026,187 by McCauley, N., filed Sep. 13, 2013.
(Continued)

*Primary Examiner* — Robert A Sorey
*Assistant Examiner* — Kristine K Rapillo
(74) *Attorney, Agent, or Firm* — Mattingly & Malur, PC

(57) ABSTRACT

A card reader configured to read a smart card can be detachably connected to a mobile computing device. When the card reader is attached to the mobile device, an application installed on the mobile computing device permits the mobile device to communicate with the card reader in order to process transactions.

Security measures can be used on the mobile device to prevent theft of a PIN during software PIN entry of a payment transaction. The mobile device can prevent the keypad or other input interface from displaying feedback. The mobile device can also prevent passcodes from being stolen by displaying media encoded with digital rights management (DRM) and by managing the media and user inputs at a secure server.

A mobile device can securely communicate with a card reader for a payment transaction using asymmetric or symmetric encryption.

49 Claims, 11 Drawing Sheets

(51) Int. Cl.
  *G06Q 20/38* (2012.01)
  *G07F 7/10* (2006.01)
  *H04L 29/06* (2006.01)
  *G06Q 20/32* (2012.01)
  *G06F 21/35* (2013.01)
  *H04W 12/06* (2009.01)
  *H04L 9/32* (2006.01)
  *G07F 19/00* (2006.01)

(52) U.S. Cl.
  CPC ..... *G06Q 20/3674* (2013.01); *G06Q 20/3829* (2013.01); *G07F 7/1041* (2013.01); *G07F 7/1091* (2013.01); *G07F 19/211* (2013.01); *H04L 9/3226* (2013.01); *H04L 9/3271* (2013.01); *H04L 63/06* (2013.01); *H04L 63/083* (2013.01); *H04W 12/06* (2013.01); *G06Q 2220/00* (2013.01); *H04L 2209/805* (2013.01)

(56) References Cited

U.S. PATENT DOCUMENTS

| | | | |
|---|---|---|---|
| 5,949,348 A | 9/1999 | Kapp et al. | |
| 5,970,146 A | 10/1999 | McCall et al. | |
| 6,257,486 B1 | 7/2001 | Teicher et al. | |
| 6,434,702 B1 | 8/2002 | Maddalozzo, Jr. et al. | |
| 6,549,194 B1 | 4/2003 | McIntyre et al. | |
| 6,925,169 B2 | 8/2005 | Habu | |
| 7,058,613 B1 | 6/2006 | Sato et al. | |
| 7,096,256 B1 | 8/2006 | Shafer | |
| 7,333,602 B2 | 2/2008 | Habu | |
| 7,596,701 B2 | 9/2009 | Varghese et al. | |
| 7,641,111 B2 | 1/2010 | Adams et al. | |
| 7,705,829 B1 | 4/2010 | Plotnikov | |
| 8,254,579 B1* | 8/2012 | Morgan | H04L 9/083 380/277 |
| 8,281,998 B2* | 10/2012 | Tang | G06Q 20/32 235/449 |
| 8,392,846 B2 | 3/2013 | Carapelli | |
| 8,613,070 B1 | 12/2013 | Borzycki et al. | |
| 8,700,895 B1 | 4/2014 | Naguib | |
| 8,978,975 B2 | 3/2015 | Barnett | |
| 9,141,977 B2* | 9/2015 | Davis | H04W 4/21 |
| 9,229,549 B1 | 1/2016 | Lee | |
| 2002/0066039 A1 | 5/2002 | Dent | |
| 2002/0188872 A1 | 12/2002 | Willeby | |
| 2002/0196274 A1 | 12/2002 | Comfort et al. | |
| 2003/0182558 A1 | 9/2003 | Lazzaro et al. | |
| 2004/0096188 A1 | 5/2004 | Kageyama | |
| 2004/0139340 A1 | 7/2004 | Johnson et al. | |
| 2005/0193208 A1 | 9/2005 | Charrette, III et al. | |
| 2005/0195170 A1 | 9/2005 | Habu | |
| 2005/0212763 A1 | 9/2005 | Okamura | |
| 2005/0229000 A1 | 10/2005 | Shoji et al. | |
| 2005/0250538 A1 | 11/2005 | Narasimhan et al. | |
| 2005/0251451 A1 | 11/2005 | Tan et al. | |
| 2005/0256742 A1 | 11/2005 | Kohan et al. | |
| 2006/0053301 A1 | 3/2006 | Shin | |
| 2006/0165060 A1 | 7/2006 | Dua | |
| 2006/0218397 A1 | 9/2006 | Brown et al. | |
| 2006/0224523 A1 | 10/2006 | Elvitigala | |
| 2007/0089164 A1 | 4/2007 | Gao et al. | |
| 2007/0096946 A1 | 5/2007 | Kim et al. | |
| 2007/0118736 A1 | 5/2007 | Huque | |
| 2007/0168674 A1 | 7/2007 | Nonaka et al. | |
| 2007/0241180 A1 | 10/2007 | Park et al. | |
| 2007/0250920 A1 | 10/2007 | Lindsay | |
| 2008/0017711 A1* | 1/2008 | Adams | G06K 7/0008 235/439 |
| 2008/0091944 A1 | 4/2008 | vo Mueller et al. | |
| 2008/0098464 A1 | 4/2008 | Mizrah | |
| 2008/0148186 A1 | 6/2008 | Krishnamurthy | |
| 2008/0165151 A1 | 7/2008 | Lemay et al. | |
| 2008/0189214 A1 | 8/2008 | Mueller et al. | |
| 2008/0244714 A1* | 10/2008 | Kulakowski | G06Q 30/06 705/50 |
| 2009/0066543 A1 | 3/2009 | Delia et al. | |
| 2009/0172810 A1 | 7/2009 | Won et al. | |
| 2009/0237361 A1 | 9/2009 | Mosby et al. | |
| 2009/0265776 A1 | 10/2009 | Baentsch et al. | |
| 2009/0271276 A1 | 10/2009 | Roberts | |
| 2009/0307768 A1 | 12/2009 | Zhang et al. | |
| 2010/0024018 A1 | 1/2010 | Koziol et al. | |
| 2010/0109920 A1 | 5/2010 | Spradling | |
| 2010/0127987 A1 | 5/2010 | Liu | |
| 2010/0138666 A1 | 6/2010 | Adams et al. | |
| 2010/0153273 A1 | 6/2010 | Sellars et al. | |
| 2011/0007008 A1 | 1/2011 | Algreatly | |
| 2011/0071949 A1 | 3/2011 | Petrov et al. | |
| 2011/0084131 A1 | 4/2011 | McKelvey | |
| 2011/0090097 A1 | 4/2011 | Beshke | |
| 2011/0185319 A1 | 7/2011 | Carapelli | |
| 2011/0204140 A1 | 8/2011 | Hart et al. | |
| 2011/0219459 A1 | 9/2011 | Andreasson | |
| 2012/0047564 A1 | 2/2012 | Liu | |
| 2012/0054401 A1 | 3/2012 | Cheng | |
| 2012/0084206 A1 | 4/2012 | Mehew et al. | |
| 2012/0084480 A1 | 4/2012 | Reeves et al. | |
| 2012/0093313 A1 | 4/2012 | Michiels | |
| 2012/0095914 A1 | 4/2012 | McKelvey et al. | |
| 2012/0130903 A1 | 5/2012 | Dorsey et al. | |
| 2012/0162124 A1 | 6/2012 | Lin | |
| 2012/0174215 A1 | 7/2012 | Steeves | |
| 2012/0174233 A1 | 7/2012 | Waterson | |
| 2012/0265981 A1 | 10/2012 | Moon et al. | |
| 2012/0268393 A1 | 10/2012 | Lee | |
| 2012/0272059 A1 | 10/2012 | Shetty et al. | |
| 2012/0284194 A1 | 11/2012 | Liu et al. | |
| 2012/0287064 A1 | 11/2012 | Kunori | |
| 2012/0303960 A1 | 11/2012 | Wankmueller et al. | |
| 2013/0046697 A1 | 2/2013 | Schibuk | |
| 2013/0047237 A1 | 2/2013 | Ahn et al. | |
| 2013/0085941 A1 | 4/2013 | Rosenbalt et al. | |
| 2013/0109371 A1 | 5/2013 | Brogan et al. | |
| 2013/0119130 A1 | 5/2013 | Braams | |
| 2013/0144792 A1* | 6/2013 | Nilsson | G06Q 20/20 705/67 |
| 2013/0171967 A1 | 7/2013 | Ashour et al. | |
| 2013/0185167 A1 | 7/2013 | Mestre et al. | |
| 2013/0239187 A1 | 9/2013 | Leddy et al. | |
| 2013/0246272 A1 | 9/2013 | Kirsch | |
| 2013/0262248 A1 | 10/2013 | Kim et al. | |
| 2013/0301830 A1 | 11/2013 | Bar-El et al. | |
| 2013/0305392 A1 | 11/2013 | Bar-El et al. | |
| 2013/0328801 A1 | 12/2013 | Quigley et al. | |
| 2013/0332360 A1 | 12/2013 | Quigley et al. | |
| 2013/0333007 A1 | 12/2013 | Chougle et al. | |
| 2013/0333011 A1 | 12/2013 | Quigley et al. | |
| 2014/0020117 A1 | 1/2014 | Nagai et al. | |
| 2014/0025579 A1 | 1/2014 | Nilsson | |
| 2014/0057621 A1 | 2/2014 | Ji et al. | |
| 2014/0096201 A1 | 4/2014 | Gupta | |
| 2014/0324708 A1 | 10/2014 | McCauley et al. | |
| 2015/0095241 A1 | 4/2015 | Edwards | |
| 2015/0100498 A1 | 4/2015 | Edwards | |
| 2015/0249662 A1 | 9/2015 | Iwanski et al. | |
| 2016/0150411 A1 | 5/2016 | Liu et al. | |
| 2016/0275515 A1 | 9/2016 | Quigley et al. | |
| 2017/0169428 A1 | 6/2017 | Edwards | |

FOREIGN PATENT DOCUMENTS

| | | |
|---|---|---|
| CA | 2 925 747 A1 | 4/2015 |
| CA | 2 925 903 A1 | 4/2015 |
| DE | 10 2007 018 802 B3 | 8/2008 |
| EP | 1 710 948 A1 | 10/2006 |
| EP | 1 770 575 A1 | 4/2007 |
| EP | 1 806 653 A1 | 7/2007 |
| EP | 2 141 647 A1 | 1/2010 |
| EP | 2 207 124 A2 | 7/2010 |
| FR | 2 693 815 A1 | 1/1994 |
| GB | 2 373 616 | 9/2002 |
| JP | 2000-305899 A | 11/2000 |

(56) References Cited

FOREIGN PATENT DOCUMENTS

| | | | |
|---|---|---|---|
| JP | 2002-074508 A | 3/2002 |
| JP | 2004-102460 A | 4/2004 |
| JP | 2007-86873 A | 4/2007 |
| JP | 3976201 B2 | 9/2007 |
| JP | 2008-065365 A | 3/2008 |
| JP | 2012-530269 A | 11/2012 |
| JP | 2013-507720 A | 3/2013 |
| JP | 2015-501100 A | 1/2015 |
| KR | 2001-0056090 A | 7/2001 |
| KR | 10-2010-0047097 A | 5/2010 |
| KR | 10-1228088 B1 | 2/2013 |
| KR | 10-1228090 B1 | 2/2013 |
| WO | 98/12615 A2 | 3/1998 |
| WO | 2010/024923 A1 | 3/2010 |
| WO | 2010/097711 A2 | 9/2010 |
| WO | 2011/093998 A1 | 8/2011 |
| WO | 2011/136464 A1 | 11/2011 |
| WO | 2012/122175 A1 | 9/2012 |
| WO | 2013/081589 A1 | 6/2013 |
| WO | 2013/089717 A1 | 6/2013 |
| WO | 2013/188599 A2 | 12/2013 |
| WO | 2015/017130 A1 | 2/2015 |
| WO | 2015/048040 A1 | 4/2015 |
| WO | 2015/048041 A1 | 4/2015 |

OTHER PUBLICATIONS

Non Final Office Action dated Aug. 12, 2014 for U.S. Appl. No. 13/800,920, of Quigley, O.S.C. et al., filed Mar. 13, 2013.
International Search Report and Written Opinion dated Oct. 31, 2014, for International Patent Application No. PCT/US2014/046923, filed Jul. 16, 2014.
International Search Report and Written Opinion of International Patent Application No. PCT/US2013/045523, filed Jun. 12, 2013, dated Dec. 12, 2013. 14 pages.
U.S. Appl. No. 14/050,233, of Edwards, T.J., filed Oct. 9, 2013.
U.S. Appl. No. 14/105,006, of Edwards, T.J., filed Dec. 12, 2013.
U.S. Appl. No. 14/696,235, of Quigley, O.S.C, et al., filed Apr. 24, 2015.
International Search Report and Written Opinion dated Jan. 12, 2015 for International Patent Application No. PCT/US2014/057050, filed Sep. 23, 2014.
International Search Report and Written Opinion dated Jan. 12, 2015 for International Patent Application No. PCT/US2014/057047, filed Sep. 23, 2014.
Final Office Action dated Feb. 18, 2015, for U.S. Appl. No. 13/800,920, of Quigley, O.S.C., et al., filed Mar. 13, 2013.
Non-Final Office Action dated May 21, 2015, for U.S. Appl. No. 13/800,920, of Quigley, O.S.C., et al., filed Mar. 13, 2013.
"A Guide to EMV—Version 1.0 (presentation)," EMVCo, dated May 2011, pp. 1-39.
"A Guide to EMV—Version 1.0," EMVCo LLC, dated May 2011, pp. 1-35.
"EMV Essentials for US Credit Unions," A Mercator Advisory Group Research Brief Sponsored by CSCU, dated Mar. 22, 2012, pp. 1-15.
"MasterCard PayPass, Terminal Implementation Requirements," Mastercard Worldwide, 2007 v.1, on Sep. 10, 2015, pp. 1-62.
Fillmore, P., "Mobile and Contactless Payment and Security," v20111118, Witham Laboratories, on Nov. 18, 2011, pp. 1-39.
Non-Final Office Action dated Oct. 1, 2015, for U.S. Appl. No. 13/799,724, of Quigley, O.S.C., et al., filed Mar. 13, 2013.
Non-Final Office Action dated Oct. 7, 2015, for U.S. Appl. No. 13/800,789, of Quigley, O.S.C., et al., filed Mar. 13, 2013.
Final Office Action dated Oct. 21, 2015, for U.S. Appl. No. 13/800,920, of Quigley, O.S.C., et al., filed Mar. 13, 2013.
Non-Final Office Action dated Nov. 4, 2015, for U.S. Appl. No. 14/696,235, of Quigley, O.S.C., et al., filed Apr. 24, 2015.
Zezschwitz, E V., et al., "Making Graphic-Based Authentication Secure against Smudge Attacks," Session: Emotion and User Modeling, IUI'13, dated Mar. 19-23, 2013, pp. 277-286.

Advisory Action dated Jan. 22, 2016, for U.S. Appl. No. 13/800,920, of Quigley, O.S.C., et al., filed Mar. 13, 2013.
Final Office Action dated Feb. 4, 2016, for U.S. Appl. No. 13/799,724, of Quigley, O.S.C., et al., filed Mar. 13, 2013.
Notice of Allowance dated Mar. 11, 2016, for U.S. Appl. No. 13/800,920, of Quigley, O.S.C., filed Mar. 13, 2013.
Notice of Allowance dated Mar. 23, 2016, for U.S. Appl. No. 13/800,789, of Quigley, O.S.C., filed Mar. 13, 2013.
Non-Final Office Action dated Mar. 24, 2016, for U.S. Appl. No. 14/041,863, of Edwards, T.J., filed Sep. 30, 2013.
Non-Final Office Action dated Mar. 24, 2016, for U.S. Appl. No. 14/050,233, of Edwards, T.J., filed Oct. 9, 2013.
Non-Final Office Action dated Apr. 18, 2016, for U.S. Appl. No. 14/050,216, of Edwards, T.J., filed Oct. 9, 2013.
Final Office Action dated Jun. 17, 2016, for U.S. Appl. No. 14/696,235, of Quigley, O.S.C., et al., filed Apr. 24, 2015.
Non-Final Office Action dated Jun. 23, 2016, for U.S. Appl. No. 14/105,006, of Edwards, T.J., filed Dec. 12, 2013.
Notice of Allowance dated Oct. 3, 2016, for U.S. Appl. No. 14/041,863, of Edwards, T.J., filed Sep. 30, 2013.
Final Office Action dated Oct. 4, 2016, for U.S. Appl. No. 14/050,233, of Edwards, T.J., filed Oct. 9, 2013.
Advisory Action dated Oct. 4, 2016, for U.S. Appl. No. 14/696,235, of Quigley, O.S.C., et al., filed Apr. 24, 2015.
Non-Final Office Action dated Nov. 3, 2016, for U.S. Appl. No. 14/026,187, of McCauley, N., filed Sep. 13, 2013.
Non-Final Office Action dated Nov. 18, 2016, for U.S. Appl. No. 15/169,260, of Quigley, O.S.C., et al., filed May 31, 2016.
Notice of Allowance dated Nov. 23, 2016, for U.S. Appl. No. 14/050,216, of Edwards, T.J., filed Oct. 9, 2013.
Advisory Action dated Dec. 20, 2016, for U.S. Appl. No. 14/050,233, of Edwards, T.J., filed Oct. 9, 2013.
Final Office Action dated Dec. 23, 2016, for U.S. Appl. No. 14/105,006, of Edwards, T.J., filed Dec. 12, 2013.
Examination Report No. 1 for Australian Patent Application No. 2014327030, dated Dec. 2, 2016.
Examination Report No. 1 for Australian Patent Application No. 2014327031, dated Dec. 7, 2016.
Extended European Search Report for European Patent Application No. 14832098.9, dated Dec. 14, 2016.
English-language translation of Search Report for Japanese Patent Application No. 2016-531736, dated Apr. 27, 2017.
English-language translation of Notification of Reasons for Refusal for Japanese Patent Application No. 2016-531736, dated May 26, 2017.
Notice of Allowance dated May 30, 2017, for U.S. Appl. No. 14/026,187, of McCauley, N., filed Sep. 13, 2013.
Notice of Acceptance for Australian Patent Application No. 2014327030, dated Jun. 14, 2017.
Final Office Action dated Jun. 26, 2017, for U.S. Appl. No. 15/169,260, of Quigley, O.S.C., et al., filed May 31, 2016.
Non Final Office Action dated Jul. 14, 2017, for U.S. Appl. No. 14/696,235, of Quigley, O.S.C., et al., filed Apr. 24, 2015.
Final Office Action dated Aug. 21, 2017, for U.S. Appl. No. 14/055,838, of McCauley, N.P., et al., filed Oct. 16, 2013.
Park, Y.S., and Han, S.H., "Touch key design for one-handed thumb interaction with a mobile phone: Effects of touch key size and touch key location," International Journal of Industrial Ergonomics, vol. 40, Issue 1, pp. 68-76 (Jan. 1, 2010).
Non Final Office Action dated Jan. 13, 2017, for U.S. Appl. No. 14/696,235, of Quigley, O.S.C., et al., filed Apr. 24, 2015.
Examiner Requisition for Canadian Patent Application No. 2,925,747, dated Jan. 19, 2017.
Examiner Requisition for Canadian Patent Application No. 2,925,903, dated Feb. 3, 2017.
Non Final Office Action dated Feb. 10, 2017, for U.S. Appl. No. 14/055,838, of McCauley, N.P., et al., filed Oct. 16, 2013.
Non Final Office Action dated Feb. 24, 2017, for U.S. Appl. No. 14/050,233, of Edwards, T.J., filed Oct. 9, 2013.
Intention to Grant for European Patent Application No. 13734545.0, dated Mar. 9, 2017.
Examination Report No. 1 for Australian Patent Application No. 2014296635, dated Feb. 13, 2017.

(56) References Cited

OTHER PUBLICATIONS

Extended European Search Report for European Patent Application No. 14848803.4, dated Feb. 3, 2017.
Extended European Search Report for European Patent Application No. 14848354.8, dated Feb. 3, 2017.
Intention to Grant for European Patent Application No. 13734545.0, dated Aug. 17, 2017.
"Bluetooth," Wikipedia, dated Jun. 10, 2012, Retrieved from the Internet URL: https://en.wikipedia.org/w/index.php?title=Bluetooth &oldid=496913037, on Nov. 24, 2017, pp. 1-22.
Notice of Acceptance for Australian Patent Application No. 2014327031, dated Dec. 4, 2017.
Extended European Search Report for European Patent Application No. 17193013.4, dated Dec. 4, 2017.
Examiner Requisition for Canadian Patent Application No. 2,925,747, dated Dec. 14, 2017.
Office Action for European Patent Application No. 14848803.4, dated Feb. 14, 2018.
Office Action for European Patent Application No. 14848354.8, dated Feb. 16, 2018.
"Security Requirements for Cryptographic Modules," National Institute of Standards and Technology, FIPS Pub 140-1, on Jan. 11, 1994, pp. 1-69.
Denning, E.D., "Field Encryption and Authentication", Advances in Cryptology: Proceedings of Crypto, pp. 1-17 (1983).
Denning, R.E.D., "Cryptography and Data Security," Purdue University (1982), pp. 1-199 [Part-1].
Denning, R.E.D., "Cryptography and Data Security," Purdue University (1982), pp. 200-209 [Part-2].
Koch, H.S., et al., "The application of cryptography for data base security," AFIPS National Computer Conference, dated Jun. 7-10, 1976, pp. 97-107.
Notice of Allowance dated Nov. 13, 2017, for U.S. Appl. No. 14/105,006, of Edwards, T.J., filed Dec. 12, 2013.
Non-Final Office Action dated Dec. 20, 2017, for U.S. Appl. No. 14/055,838, of McCauley, N.P., et al., filed Oct. 16, 2013.
Final Office Action dated Jan. 26, 2018, for U.S. Appl. No. 14/696,235, of Quigley, O.S.C., et al., filed Apr. 24, 2015.
English-language translation of Decision of Refusal for Japanese Patent Application No. 2016-531736, dated Jan. 29, 2018.

* cited by examiner

SOFTWARE PIN ENTRY

CROSS REFERENCE TO RELATED APPLICATIONS

This application is a non-provisional of and claims priority to U.S. Provisional Patent Application No. 61/658,828, filed on Jun. 12, 2012, the entire contents of which are hereby incorporated by reference.

TECHNICAL FIELD

This disclosure relates to mobile card processing using mobile devices.

BACKGROUND

In a conventional point-of-sale electronic credit card transaction with a smart card (also called a "chip card" or "integrated circuit card"), a cardholder's identity is confirmed by requiring the entry of a Personal Identification Number (PIN) rather than or in addition to signing a paper receipt. A user provides a card at the point-of-sale to a merchant. The card contains an embedded microchip which stores the PIN. The merchant processes the card using a card reader, e.g., the card is inserted into the reader to engage electrical contacts for the microchip. The card reader verifies the card as authentic and waits for the user to enter the PIN. The user can enter the PIN on a PIN a keypad terminal of the reader, i.e., the keypad and the reader are a single physically integrated device. After the user enters the PIN, the microchip notifies the card reader as to whether the entered PIN is correct or incorrect.

The card transaction is further authorized and captured. In the authorization stage, if the entered PIN is correct, a payment request is sent electronically from the card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include a cardholder's signature, if appropriate. The capture state can trigger the financial transaction between the card issuer and the merchant, and optionally creates a receipt. There can also be other entities, e.g., the card acquirer, in the route of the transaction. Debit card transactions have a different routing, but also require insertion of the smart card into a reader.

Mobile card readers are available for magnetic stripe cards. Some mobile card readers use WiFi technology to communicate with the credit card processor via a wireless network access point. Some mobile card readers, e.g., in taxies, use cellular technology to communicate wirelessly with the credit card processor.

SUMMARY

Existing chip card readers are generally bulky and expensive. However, a card reader configured to read a smart card can be detachably connected to a mobile computing device, e.g., a smart phone, tablet computer, or the like. The PIN can be entered on a touch display of the mobile computing device. This permits the mobile device to be a common consumer device, e.g., an iPhone or iPad. When the card reader is attached to the mobile device, e.g., plugged into the audio port, an application installed on the mobile computing device permits the mobile device to communicate with the card reader in order to process transactions.

Security measures can be used on the mobile device to prevent theft of a PIN during software PIN entry of a payment transaction. Malware or other unauthorized software can take screenshots of a display of the mobile device or detect locations of user input during PIN entry. When a user inputs a PIN on the mobile device on a keypad interface, the mobile device provides user feedback, e.g., the mobile device highlights, on the keypad interface, a background of a cell that the user interfaced with. The mobile device can prevent the keypad or other input interface, e.g., a keyboard, from displaying feedback. The mobile device can also prevent passcodes from being stolen by displaying media encoded with digital rights management (DRM) and by managing the media and user inputs at a secure server.

A mobile device can securely communicate with a card reader for a payment transaction using asymmetric or symmetric encryption. The mobile device verifies a card reader's identity using a certificate installed in the card reader.

In one aspect, a method for processing payment transactions between a card, a card reader and a mobile device includes receiving batched information from the mobile device, where the batched information includes information required for a transaction, where the transaction requires a plurality of authentication codes before the transaction is approved or denied; receiving, from the card, distinct requests for information from the batched information; and providing, to the card, the information based on the respective request, where the card generates the plurality of authentication codes based on the information.

Implementation may include one or more of the following. The batched information includes transaction details and an application selection, where the transaction details include one or more of the following: transaction amount, currency type, date, nonce, or verification results. The batched information includes a passcode from a user. The batched information is sent when the card is inserted into the card reader. The batched information is sent before the card is inserted into the card reader. Receiving the plurality of authentication codes from the card; transmitting the plurality of authentication codes to the mobile device, which sends the plurality of authentication codes to an issuing bank associated with the card; receiving a response from the issuing bank, where the response authorizes the plurality of authentication codes; and sending the response to the card.

In another aspect, a method for providing security during passcode entry on a mobile device includes displaying an interface for receiving a passcode, where the interface includes one or more objects; receiving user input on a display of the mobile device; not displaying feedback based on the user input, where the mobile device does not display feedback in one or more of the one or more objects; determining the passcode based on the user input; and submitting the passcode for authentication.

Implementation may include one or more of the following. Submitting the passcode to a card reader. The feedback takes form through one or more of the following: visual, audio, or tactile. The one or more objects include a keypad and a passcode field, and where the mobile device displays, on the passcode field, a symbol for each user entry from the user, and where the mobile device does not display, on the keypad, feedback based on the user input. The one or more objects include a keypad and a passcode field, and where the mobile device does not display feedback in the keypad or the passcode field. The feedback is not displayed in any of the one or more objects. The feedback is displayed in some of the one or more objects. Disabling an ability of the one or more objects to change visual state. The determining is based on locations of the user input on the display.

In another aspect, a method for providing security during passcode entry on a mobile device includes receiving, from a server, a media file, where content of the media file includes an interface for receiving a passcode, where the media file is encoded by digital rights management, and where locations of input values of the interface are randomly generated; displaying the media file; receiving user input on a display of the mobile device; determining locations of the user input on the display; sending the locations to the server; receiving a passcode from the server, where the passcode is based on the locations; and submitting the passcode for authentication.

Implementation may include one or more of the following. Displaying the media file prevents the mobile device from taking screenshots. The media file is an image or a movie. Submitting comprises: submitting the passcode to a card reader. The displaying further comprises: decoding the media file at a module for digital rights management; and displaying the decoded file. The input values of the interface include numbers 0-9.

In another aspect, a method for providing security during passcode entry on a mobile device includes generating a media file, where the media file is encoded with digital rights management, where content of the media file includes an interface for receiving a passcode, where locations of input values of the interface are randomly generated; sending the media file to the mobile device; receiving, from the mobile device, locations of user input on a display of the mobile device; determining a user inputted passcode based on the locations of the user input on the display and the locations of input values of the interface; and sending the user inputted passcode to the mobile device.

Implementation may include one or more of the following. The user inputted passcode is encrypted prior to sending the user inputted passcode. The media file is an image or a movie.

In another aspect, a method for securely communicating between a card reader and a mobile device includes receiving a unique identification code of the card reader; sending the unique identification code to a server; receiving a cryptographic key from the server, where the cryptographic key is associated with the unique identification code; and encrypting data using the cryptographic key; sending the data to the card reader; receiving encrypted data from the card reader; decrypting the encrypted data using the cryptographic key; processing the unencrypted data; and continuing secure communication between the card reader and the mobile device, wherein continuing secure communication includes encrypting and decrypting using the cryptographic key.

Implementation may include one or more of the following. The unique identification code is thirty two bits or sixty four bits in length. Prior to receiving the unique identification code, a card is swiped at the card reader. The data includes a passcode associated with the card. The encrypted data is an acknowledgment that the passcode is verified. The processing comprises: submitting a payment transaction to a payment processing system. Prior to the encrypting, further comprising: receiving a certificate from the card reader; sending the certificate to the server, where the server verifies a signature of the certificate; and receiving a verification of the certificate from the server. Prior to sending the unique identification code to the server, encrypting the unique identification code using a public key from the server; and where prior to decrypting the encrypted data using the cryptographic key, decrypting the encrypted data using a private key of the mobile device. The unique identification code and encrypted data are received from an audio jack of the mobile device, and where the data is sent through the audio jack. The unique identification code and encrypted data are received wirelessly from the mobile device, and where the data is sent wirelessly.

In another aspect, a method for securely communicating between a card reader and a mobile device includes sending a unique identification code to the mobile device; receiving encrypted data from the mobile device; decrypting the encrypted data using a cryptographic key; encrypting a response using the cryptographic key; sending the response to the mobile device; and continuing secure communication between the card reader and the mobile device, wherein continuing secure communication includes encrypting and decrypting transmissions using the cryptographic key.

Implementation may include one or more of the following. The unique identification code is 32 bits or 64 bits in length. Prior to sending the unique identification code, a card is swiped at the card reader. The encrypted data includes a passcode associated with the card. The response is an acknowledgment that the passcode is verified. Sending a certificate to the mobile device. The cryptographic key is embedded in the card reader during manufacturing of the card reader. The unique identification code and the response are sent from an audio jack of the mobile device, and where the encrypted data is received through the audio jack. The unique identification code and the response are sent wirelessly from the mobile device, and where the encrypted data is received wirelessly In another aspect, a method for securely communicating between a card reader and a mobile device includes receiving a unique identification code of the card reader; generating first data to be processed by the card reader, where the first data is encrypted using a first cryptographic key; sending the unique identification code and the encrypted data to a server, where the server conducts operations that further comprise: decrypting the encrypted first data using the first cryptographic key; obtaining a second cryptographic key based on the unique identification code, where the second cryptographic key is associated with the card reader; generating a response based on the first data, where the response is encrypted using the second cryptographic key; and sending the encrypted response to the mobile device; receiving the encrypted response from the server; and sending the encrypted response to the card reader.

Implementation may include one or more of the following. The unique identification code is thirty two bits or sixty four bits in length. Prior to receiving the unique identification code, a card is swiped at the card reader. The data includes a passcode associated with the card. The encrypted data is an acknowledgment that the passcode is verified. Prior to sending the unique identification code and the encrypted data to the server, further comprising: receiving a certificate from the card reader; sending the certificate to the server, where the server verifies a signature of the certificate; and receiving a verification of the certificate from the server. Receiving second data from the card reader, where the second data is encrypted; sending the unique identification and the second data to the server, where the server conducts operations that further comprise: obtaining the second cryptographic key based on the unique identification code, where the second cryptographic key is associated with the card reader; decrypting the encrypted second data using the second cryptographic key; generating a response based on the second data, where the response is encrypted using the first cryptographic key; and sending the encrypted response to the mobile device; receiving the encrypted response from the server; decrypting the encrypted response using the first cryptographic key; and processing the response. The processing comprises: submitting a payment transaction to a payment processing system. The unique identification code is received from an audio jack of the mobile device, and where the encrypted response is sent through the audio jack. The unique identification code is received wirelessly from the mobile device, and where the encrypted response is sent wirelessly.

In another aspect, a method for securely communicating between a card reader and a mobile device, comprising: sending a unique identification code to the mobile device; receiving encrypted data from the mobile device; decrypting the encrypted data using a cryptographic key; encrypting a response using the cryptographic key; and sending the response to the mobile device.

Implementation may include one or more of the following. The unique identification code is 32 bits or 64 bits in length. Prior to sending the unique identification code, a card is swiped at the card reader. The encrypted data includes a passcode associated with the card. The response is an acknowledgment that the passcode is verified. The unique identification code and the response are sent from an audio jack of the mobile device, and where the encrypted data is received through the audio jack. The unique identification code and the response are sent wirelessly, and where the encrypted data is received wirelessly.

In another aspect, a method for securely communicating between a card reader and a mobile device includes receiving a cryptographic key of the card reader; encrypting data using the cryptographic key; sending the data to the card reader; receiving encrypted data from the card reader; decrypting the encrypted data using the cryptographic key; and processing the unencrypted data.

Implementation may include one or more of the following. Prior to receiving the cryptographic key, a card is swiped at the card reader. The data includes a passcode associated with the card. The encrypted data is an acknowledgment that the passcode is verified. The processing comprises: submitting a payment transaction to a payment processing system. Prior to the encrypting, further comprising: receiving a certificate from the card reader; sending the certificate to the server, where the server verifies a signature of the certificate; and receiving a verification of the certificate from the server. The cryptographic key and the encrypted data are received from an audio jack of the mobile device, and where the data is sent through the audio jack. The cryptographic key and the encrypted data are received wirelessly, and where the data is sent wirelessly.

In another aspect, a method for securely communicating between a card reader and a mobile device includes sending a cryptographic key to the mobile device; receiving encrypted data from the mobile device; decrypting the encrypted data using the cryptographic key; encrypting a response using the cryptographic key; and sending the response to the mobile device.

Implementation may include one or more of the following. Prior to sending the unique identification code, a card is swiped at the card reader. The encrypted data includes a passcode associated with the card. The response is an acknowledgment that the passcode is verified. The cryptographic key and the response are sent from an audio jack of the mobile device, and where the encrypted data is received through the audio jack. The cryptographic key and the response are sent wirelessly from the mobile device, and where the encrypted data is received wirelessly.

In another aspect, a method for processing payment transactions between a card, a card reader and a mobile device includes receiving a card insertion at the card reader; sending a notification of the card insertion to the mobile device; receiving a passcode from the mobile device, where the mobile device receives the passcode based on user input on a display of the mobile device, and where the passcode is associated with the card; sending the passcode to the card, where the card determines the passcode matches an embedded passcode in the card; sending an approval for a transaction to the mobile device.

Implementation may include one or more of the following. The notification and the approval are sent over an audio jack of the mobile device, and where the passcode is received over the audio jack. The notification and the approval are sent wirelessly from the mobile device, and where the passcode is received wirelessly. The passcode is encrypted, and where prior to sending the passcode to the card, decrypting the encrypted password using a cryptographic key. The approval is encrypted using a cryptographic key.

Advantages may include one or more of the following. A card reader can communicate bi-directionally with a mobile device through an audio jack. This enables processing of a transaction that requires multiple round trips, e.g., a payment transaction that requires PIN verification. The card reader can batch requests to the phone, and vice-versa, to save power. The mobile device can prevent theft of sensitive information, e.g., passcode information, during passcode entry by limiting feedback to the user and using DRM-encoded files. The mobile device can also ensure the card reader is a verified device and securely communicate with the verified card reader to prevent fraud or theft.

BRIEF DESCRIPTION OF THE DRAWINGS

Like reference numbers and designations in the various drawings indicate like elements.

DETAILED DESCRIPTION

Figure 1:
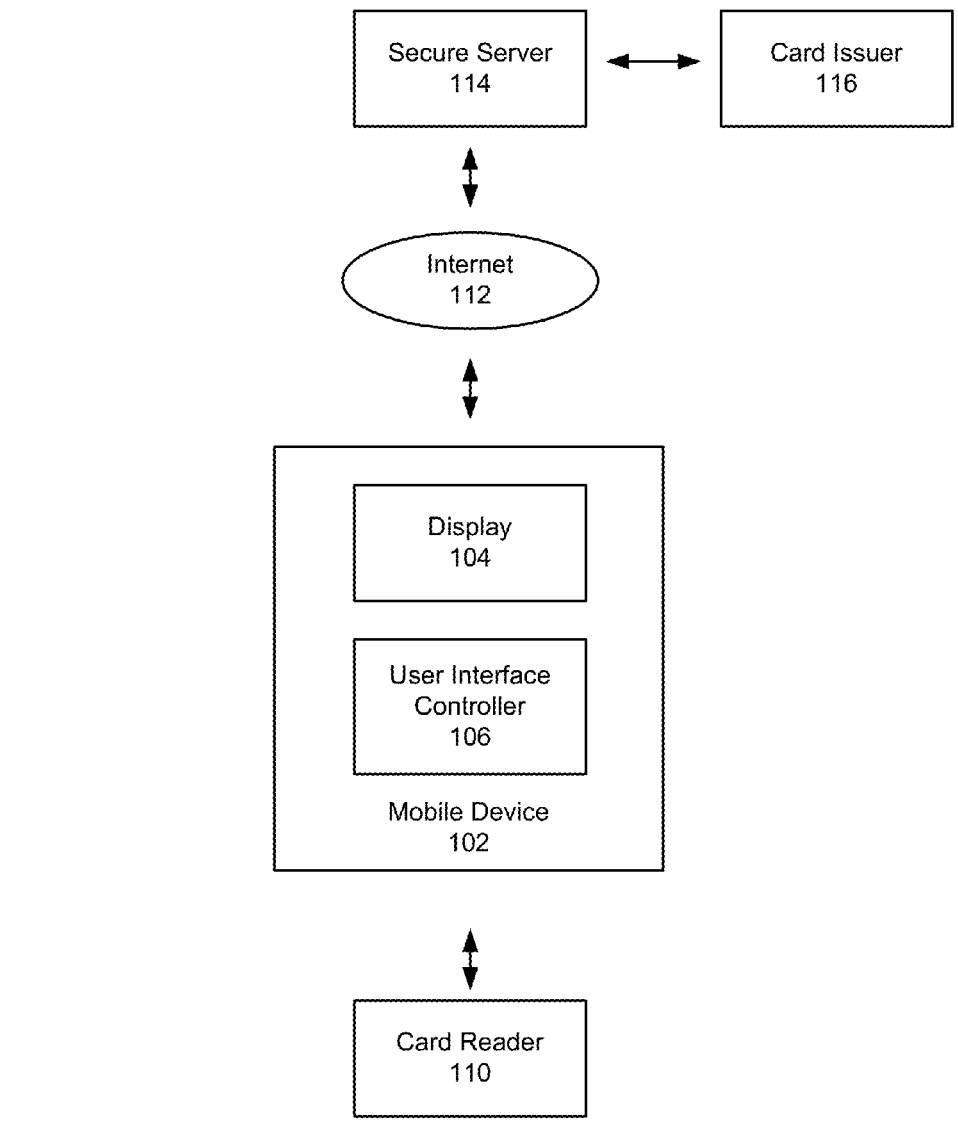
FIG. 1 is a schematic illustration of an example system for conducting a transaction using PIN entry.

FIG. 1 is a schematic illustration of an example system 100 for conducting a transaction using PIN entry. In some implementations, the system 100 is capable of processing a payment transaction between a mobile computing device 102 and a card reader 110. The mobile computing device 102 can be a smart phone, tablet computer or laptop, or other data processing apparatus. The card reader 110 can be detachably connected to the mobile computing device 102. The card reader 110 is a device that reads data from a card-shaped storage medium. In other words, the card reader 110 does not have a display or a keyboard, but the card reader 110 has an interface for inserting or swiping a card. For example, the system 100 can process the card according to the Europay, Mastercard, Visa (EMV) protocol.

As a general overview, a card can be inserted into the card reader 110 so that the reader engages electrical contacts for the microchip on the card. The card reader 110 sends a PIN request to the mobile device 102. In some implementations, the card reader 110 is attached to an audio jack or headset jack of the mobile device 102. In alternative implementations, the card reader 110 communicates with the mobile device 102 wirelessly, e.g., using Bluetooth technology or a WiFi hotspot. The mobile device 102 receives a PIN from the user, e.g., entered through a user interface of the mobile device 102, e.g., a touch-screen display, and sends the PIN to the card reader 110 for confirmation, e.g., over the audio jack of the mobile device 102. The card reader 110 can read, on the card, a chip that contains an embedded PIN. The card reader 110 compares the entered PIN to the embedded PIN. If the PINs match, the card reader 110 sends a confirmation to the mobile device 102, e.g., over the audio jack. The mobile device 102 can transmit an authorization for transaction to a secure server 114 for payment processing using an external network, e.g., the Internet 112. The secure server 114 can relay the transaction to the card issuer 116, which ultimately approves or denies the transaction. The card issuer 116 can communicate the approval or denial to the secure server 114, which can relay the card issuer's response to the mobile device 102. More transaction details will be discussed below in reference to FIG. 2.

The mobile device 102 includes a display 104 and a user interface controller 106. The user interface controller 106 can generate a user interface for PIN entry. The user interface can be a keypad interface or a keyboard interface. The mobile device 102 can display the generated interface on the display 104. For example, the generated interface can be a keypad interface with numbers 0-9. This is described further below in reference to FIG. 4.

Figure 2:
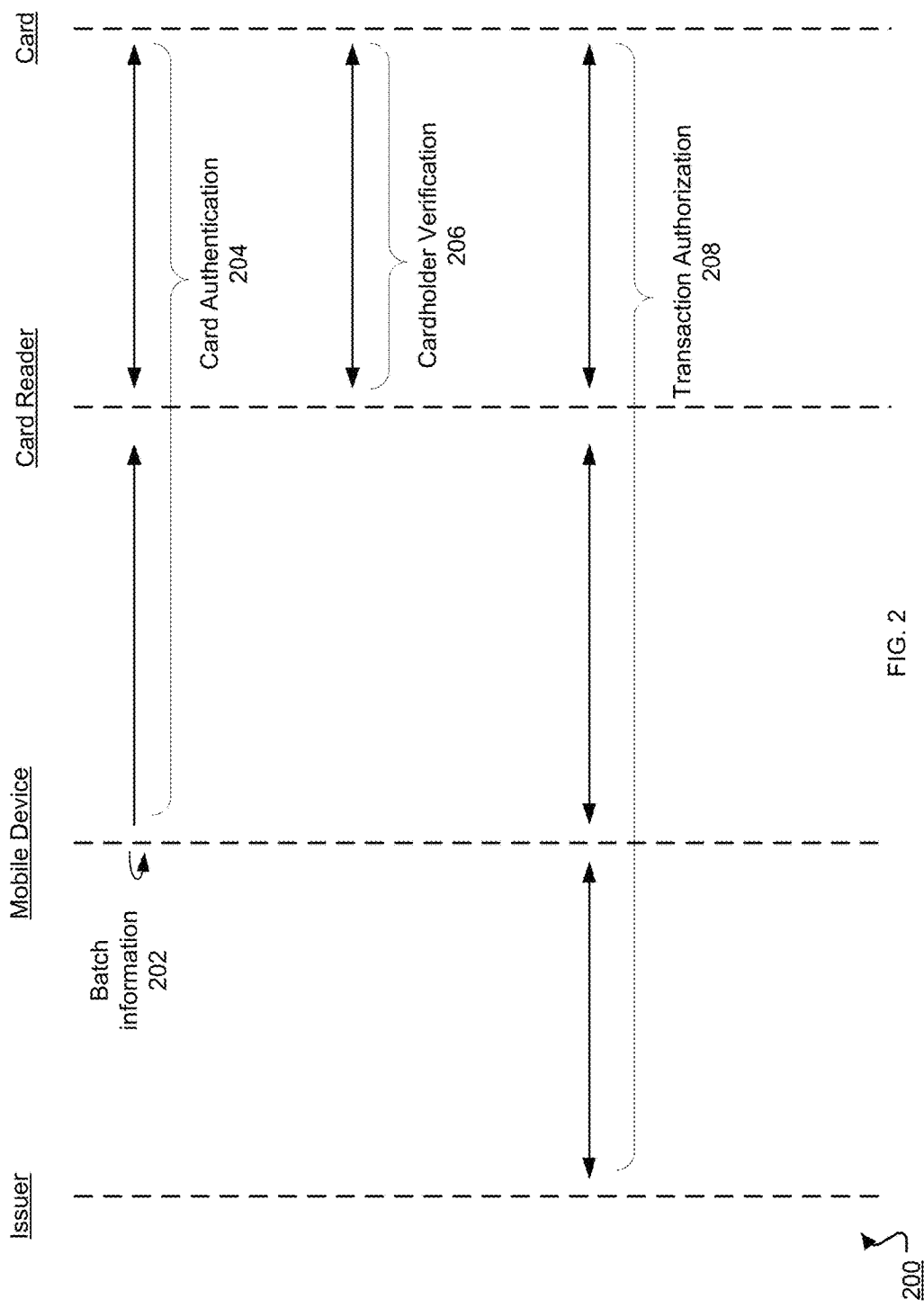
FIG. 2 is a diagram of an example method for conducting a transaction using PIN entry by batching commands from a mobile device to a card reader.

FIG. 2 is a diagram of an example method (step 200) for conducting a transaction using PIN entry by batching commands from a mobile device to a card reader. Conducting a transaction using PIN entry requires three phases: 1) card authentication (step 204), 2) cardholder verification (step 206), and 3) transaction authorization (step 208). These three phases involve communication between a card, a card reader, a mobile device, and an issuing bank. The card chip can communicate with the card reader over electrical contacts in the card reader. The card reader can communicate with the mobile device over an audio jack of the mobile device or over a wireless connection. The mobile device can directly communicate with the issuing bank using an Internet, e.g., WiFi, or 3G/4G data connection. In some implementations, the mobile device communicates with a secure server, which in turn communicates with the issuer. The mobile device can use the secure server to store information related to the transaction, e.g., a transaction receipt.

Generally, the card authentication phase (step 204) commences when a card is inserted into the card reader. The card reader requests a list of supported applications (in this context the "applications" refer to types of financial transactions, e.g., credit, debit, or ATM) from the card chip. For example, this list of supported applications can be stored in the file 1PAY.SYS.DDF01, which is selected by the card reader. The card chip sends the list, e.g., the file contents, to the card reader. The card reader receives input selecting a type of application, and sends a message to the card chip selecting the application and starting the transaction. In some implementations, the card reader selects the supported application from the list. The message starting the transaction can serve as a "read record" command to read cardholder records from the card chip. These records can include card details, e.g., primary account number, start and expiry date, backwards compatibility data, e.g., a copy of a magnetic strip, and control parameters, e.g., a type of authentication method to be used, for example, signature, PIN, or none. In some implementations, the records include a digital signature, which can be later verified by an issuing bank.

In the cardholder verification phase (step 206), the card can prompt the card reader for a PIN. The card reader then prompts the mobile device for a PIN. After the mobile device receives a PIN from the user, the mobile device sends the PIN to the card reader. The card reader sends the PIN to the card, and if the PIN matches an embedded PIN on the card, the card returns a success or a failure. In some implementations, the card maintains a retry counter to limit the number of failed PIN entries. That is, the card can reject a PIN for processing if too many PINs have been entered.

In the transaction authorization phase (step 208), the card reader requests the card to generate an authorization request cryptogram (ARQC). The request can include or be followed by the transaction details. The transaction details can include transaction amount, currency type, date, terminal verification results (TVR), and/or a nonce generated by the card reader. In response, the card chip generates the ARQC, which includes a cryptographic message authentication code (MAC). The MAC can be generated based on the transaction details. The ARQC can also include an application transaction counter (ATC), which is a sequence counter identifying the transaction, issuer application data (IAD), which is a variable length field containing data generated by the card. In some implementations, the MAC is generated using a symmetric key shared between the card and the issuing bank.

If the card permits the transaction, the card sends the ARQC to the card reader, which sends the ARQC to the mobile device. The mobile device then sends the ARQC to the issuing bank. The issuing bank can perform various cryptographic, anti-fraud, and financial checks on the ARQC. If the checks are satisfied, the issuing bank sends an authorization response code (ARC) that indicates a transaction approval or denial and an authorization response cryptogram (ARPC). In some implementations, the ARPC is a MAC resulting from an XOR operation between the ARQC and the ARC. The card reader sends both the ARPC and the ARC to the card.

The card validates the MAC contained within the ARPC. If the validation is successful, the card can update its internal state to note that the issuing bank has authorized the transaction. The card can send a transaction certificate cryptogram (TC) to the card reader. The TC indicates that the card is authorizing the transaction to proceed. After receiving the TC, the card reader sends the TC to the mobile device, which sends the TC to the issuer. The card reader, the mobile phone, or, if applicable, the secure server can store a copy of the TC in case of a dispute.

The method (step 200) can minimize information, e.g., data, transferred between the mobile device and the card reader during the three phases to save battery on both devices. This can be accomplished by batching information exchanged between the card reader and the mobile device. In particular, the information needed by the card chip can be batched when delivered from the mobile device to the card reader (step 202). Thus, instead of requesting information from the mobile device in a piecemeal fashion, e.g., when the card chip requires data, the mobile device can be configured to send batched information to the card reader and the card reader can be configured to process batched information sent from the mobile device.

The mobile device can generate batched information and send the batched information before or during the first phase, that is, the card authentication phase (step 204). In some implementations, once the card is inserted into the card reader, the card reader notifies the mobile device. Upon receiving the notification, the mobile device sends the batched information to the card reader. In alternative implementations, the mobile device sends the batched information before the card is inserted into the card reader.

The batched information sent from the mobile device to the card reader can include the application type, e.g., credit, debit, or ATM, and transaction details, e.g., the amount, currency, date, identity of payee, or a nonce. The mobile device can obtain or, if applicable, generate this information once transaction details have been finalized. In some implementations, this information is obtained from preferences within an application of the mobile device. In some implementations, the batched information includes a PIN inputted from a user. For example, the mobile device can prompt a user for a PIN before the card or the card reader requests the PIN. Once the mobile device receives the PIN from the user, the mobile device can generate the batched information to include the PIN and then send the batched information to the card reader.

The card reader can store the batched information from the mobile device and provide information when the card requires it. For example, during card authentication (step 204), the card requests an application selection from the terminal. Because the card reader already has a selected application in mind, e.g., the selection was in the batched information, the card reader can send the selected application to the card without having to query the mobile device at that time. Similarly, during transaction authorization (step 208), the card reader can provide transaction details to the card chip that were previously included in the batch information. With batched information, the card reader does not need to communicate with the mobile device. Also, if the PIN is already in the batched information, during cardholder verification (step 206), the card reader sends the PIN to the card without prompting the user for PIN entry. In addition, the records that were provided to the card reader can be provided to the mobile device in the transaction authorization step, e.g., as part of batched information that includes the ARQC.

In some implementations, some parts of the batched information are rejected as invalid from the card. For example, a PIN in the batched information can be incorrect. In this case, the card reader communicates the rejection to the mobile device, and the mobile device provides updated information to be processed by the card, e.g., the mobile device prompts the user again for another PIN and sends the PIN to the card reader. For example, a PIN in the batched information can be incorrect. As another example, the desired application in the batched information from the mobile device to the card reader may not be a supported application in the list provided by the card chip to the card reader. In this case, the card reader communicates the list of supported applications to the mobile device, and the mobile device provides an updated selection of the application or requests cancellation of the transaction, either based on a default or from user input.

Figure 3:
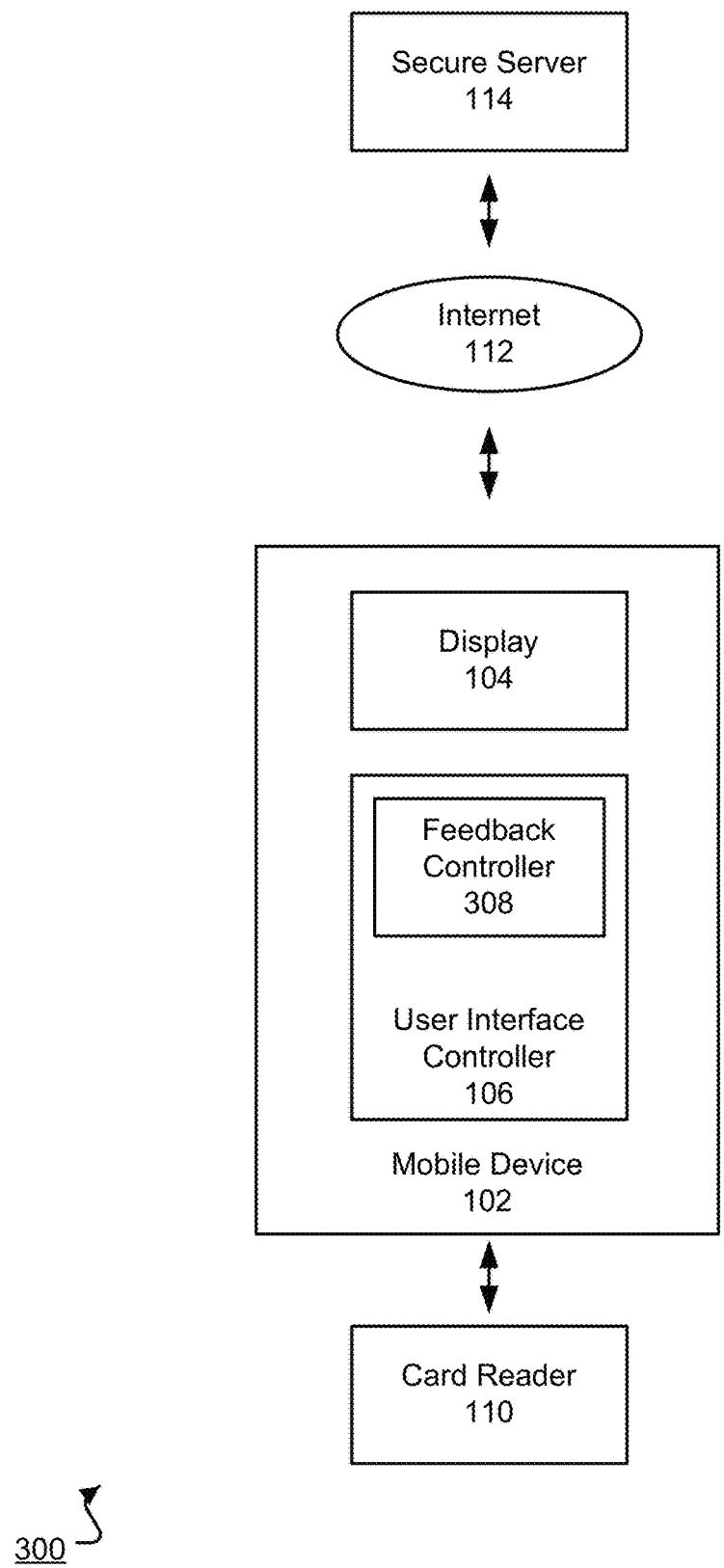
FIG. 3 is a schematic illustration of an example system for providing security during PIN entry by limiting user feedback on the display of the mobile device.

FIG. 3 is a schematic illustration of an example system 300 for providing security during PIN entry by limiting user feedback on the display of the mobile device. As described above in reference to FIG. 1, the mobile device 102 includes a display 104 and a user interface controller 106, and the mobile device 102 communicates with a card reader 110.

In addition, the user interface controller 106 can include a feedback controller 308. The user can interact with the generated interface of the user interface controller 106, e.g., a user can tap or drag a finger on the display. The feedback controller 308 processes the user feedback entered through the display. The feedback controller 308 detects user input and sends one or more events, e.g., user taps, to the user interface controller 106. The user interface controller 106 processes the one or more events, e.g., stores the value entered by the user, and determines whether to provide user feedback.

Figure 4:
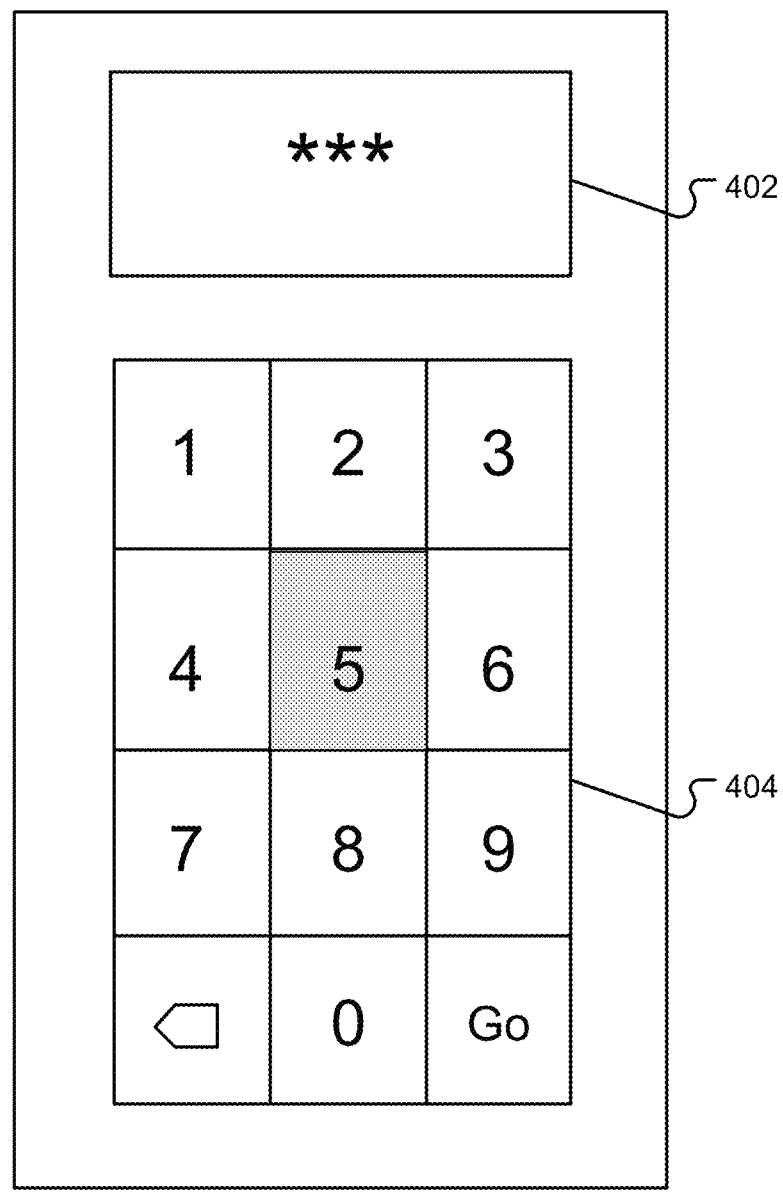
FIG. 4 is an example generated user interface on a mobile device.

In a conventional keyboard or number pad user interface on the display of a mobile device, the user interface controller 106 can provide visual feedback on the display 104. For example, if a user taps a '5' on the keypad interface, the feedback controller 308 can detect and send the tap to the user interface controller 106. The mobile device 102 can then highlight the cell '5' on the keypad interface to provide feedback to the user that the '5' was tapped. FIG. 4 is an example generated user interface 400 on a mobile device. The user interface displays a keypad 404 and a passcode field 402. The keypad 404 shows a cell of value '5' being highlighted, e.g., because a user has tapped the '5'. Once the '5' has been selected, a '*' can be displayed on the passcode field 402.

Malware on the mobile device 102 can cause the mobile device 102 to take screenshots of the display 104. For example, malware can trigger the mobile device 102 to take a screenshot upon receiving an event at the feedback controller 308. Other triggers are possible, e.g., malware causes the mobile device to take screenshots randomly or continuously for a time interval. For example, if malware causes a screenshot to be taken during PIN entry of a user, and if a cell is highlighted based on the user input, the screenshot will show the keypad interface with a highlighted cell and the malware can deduce a value in the PIN.

In some implementations, the user interface controller 106 processes the user input, e.g., stores the entered value, but does not display user feedback, e.g., when a user taps '5', the cell '5' is not highlighted on the display. Because the mobile device 102 does not display a highlighted cell on user input, the malware will take a screenshot that will not have a cell highlighted. Consequently, the malware be unable to deduce the PIN value from the screenshot and no sensitive information will be lost or stolen. In some implementations, a '*' is displayed for every individual user input while none of the cells are highlighted.

Therefore, even if malware takes a screenshot during PIN entry, the screenshot can show the length of the PIN, but the screenshot will not compromise which value is entered. For example, the passcode field 402 displays three '*', indicating three values have been selected. In some other implementations, a '*' is not displayed and a cell is not highlighted upon user input, thereby not compromising any information about the passcode in the event of a screenshot.

In some implementations, feedback to the user that a key has been pressed can provided in audio form, e.g., through external speakers, or tactile form, e.g., through vibrators in the mobile device.

Figure 5:
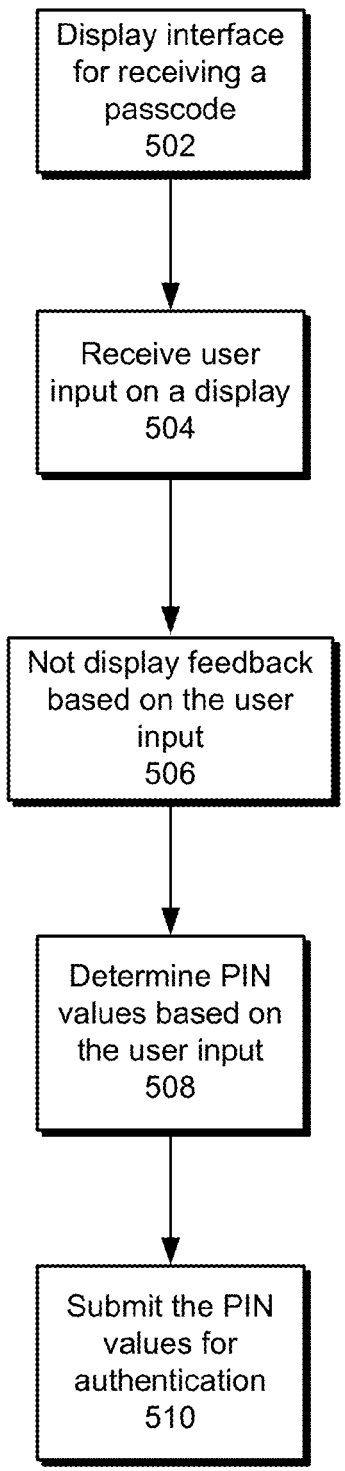
FIG. 5 is an example flow chart of a method for providing security during passcode entry by limiting user feedback on the display of the mobile device.

FIG. 5 is an example flow chart of a method 500 for providing security during passcode entry by limiting user feedback on the display of the mobile device. For convenience, the method 500 will be described with respect to a system, e.g., the system described in reference to FIG. 4. The system displays an interface for receiving a passcode (step 502). The system receives user input on a display (step 504), but the system does not display feedback to the user based on user input (step 506). In some implementations, if the interface is a keypad interface, and a user taps a cell, the cell is not highlighted. Based on the user input, the system determines the passcode, e.g., one or more PIN values (step 508). For example, the system can convert one or more user taps into respective coordinates on the display. Based on the tap coordinates and coordinates of a keypad interface, the system determines values of the passcode that is entered by the user. In some implementations, the system submits the passcode to the card reader (step 510), which authenticates the entered passcode by passing the passcode to the chip on the card and receiving verification from the chip that the passcode matches the embedded PIN values on the card.

Figure 6:
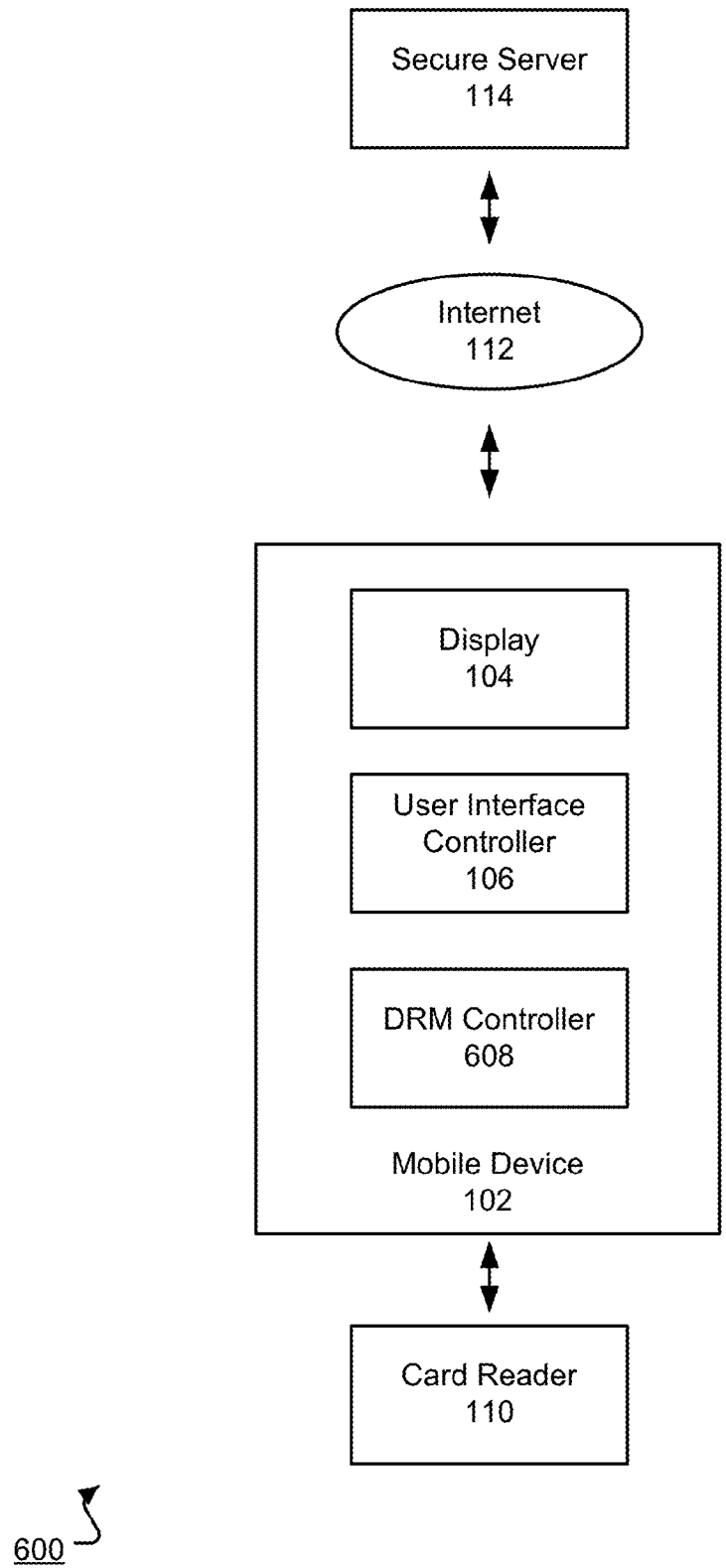
FIG. 6 is a schematic illustration of an example system for providing security during PIN entry by receiving a PIN on a randomized PIN entry interface while displaying a file encoded with digital rights management (DRM).

FIG. 6 is a schematic illustration of an example system 600 for providing security during PIN entry by receiving a PIN on a randomized PIN entry interface while displaying a file encoded with digital rights management (DRM). The file can be a media file, e.g., an image or video. In some implementations, a mobile device 102 receives the file from a secure server 114 over an external network, e.g., the Internet 112, as will be described below in reference to FIG. 7. As described above in reference to FIG. 1, the mobile device 102 includes a display 104 and a user interface controller 106, and the mobile device 102 communicates with a card reader 110.

To play a file encoded with DRM, the file is decoded by a DRM module, e.g., either installed in software or in hardware at a DRM controller 608. The DRM module can prevent the mobile device 102 from taking screenshots while the DRM-encoded file is being displayed. The mobile device 102 can detect user input while the file is playing using a user interface controller 106, e.g., similar to the feedback controller in reference to FIG. 3.

Figure 7:
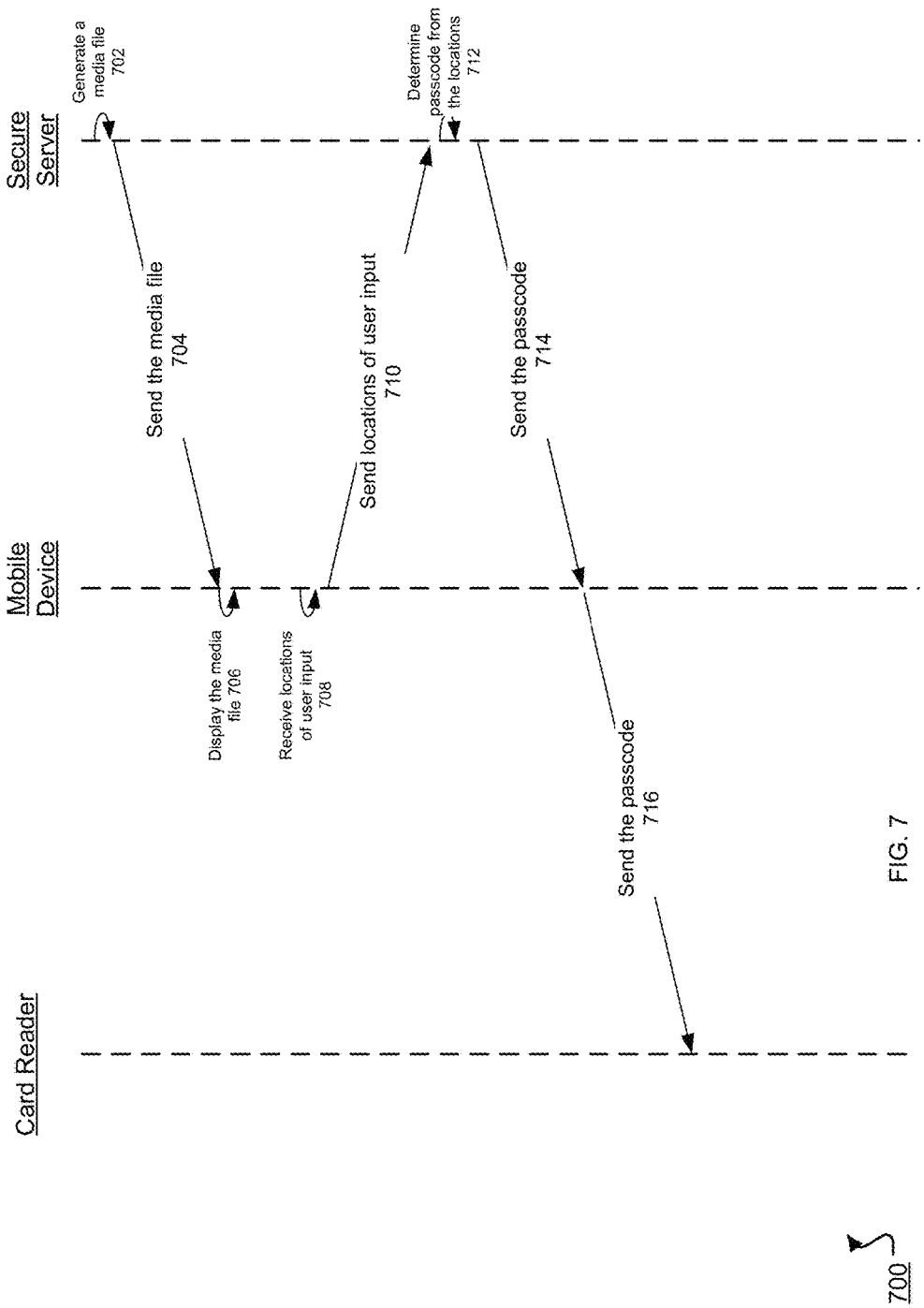
FIG. 7 is a diagram of an example method for providing security during PIN entry by receiving a PIN from a secure server.

FIG. 7 is a diagram of an example method 700 for providing security during PIN entry by receiving a PIN from a secure server. The secure server generates an interface for receiving a passcode and converts the interface into a media file (step 702). The media file can be encoded by DRM. Because the secure server generates the interface, the secure server can determine locations of input values in the interface. For example, the secure server can include a mapping of input values in the interface, e.g., a '1' button, to coordinates on the interface. An example of a randomly generated interface is described further below in reference to FIG. 8. The secure server stores the interface, e.g., in a database. The secure server sends the media file to the mobile device (step 704).

The mobile device displays the DRM-encoded media file (step 706). As mentioned above, content of the media file includes an interface for receiving a passcode, e.g., a PIN. If the file is a DRM-encoded video of a PIN entry interface, e.g., a video version of the interface shown in reference to FIG. 8, the mobile device displays the file using the DRM controller (step 706). While the media file is being displayed, the system can receive user input on the display (step 708), e.g., a user interface controller processes the input. The mobile device determines locations of user inputs, e.g., user taps, as described above in reference to FIG. 1. Locations of user inputs can be represented as an x-coordinate and y-coordinate. The mobile device sends the locations of user inputs to the secure server (step 710). The x-coordinate and y-coordinate of the user inputs can be encrypted before being sent to the secure server.

The secure server determines a passcode from the locations of user inputs (step 712). The secure server obtains the stored interface corresponding to the media file that was originally sent to the mobile device. The secure server determines the passcode by comparing the locations of user inputs with locations of input values on the stored interface. Because the user input is not converted into actual values at the mobile device, and because although the mobile device displays the media file but does not store any correspondence between the locations of the user inputs and the associated values, e.g., the correspondence is stored only on the secure server, an intruder will be unable to obtain the passcode even if the intruder can, e.g., through malware on the mobile device, detect locations of user inputs on the display. After determining the passcode, the secure server sends the passcode to the mobile device (step 714), which sends the passcode to a card reader for processing (step 716). The passcode can be encrypted before transmission from the secure server.

Figure 8:
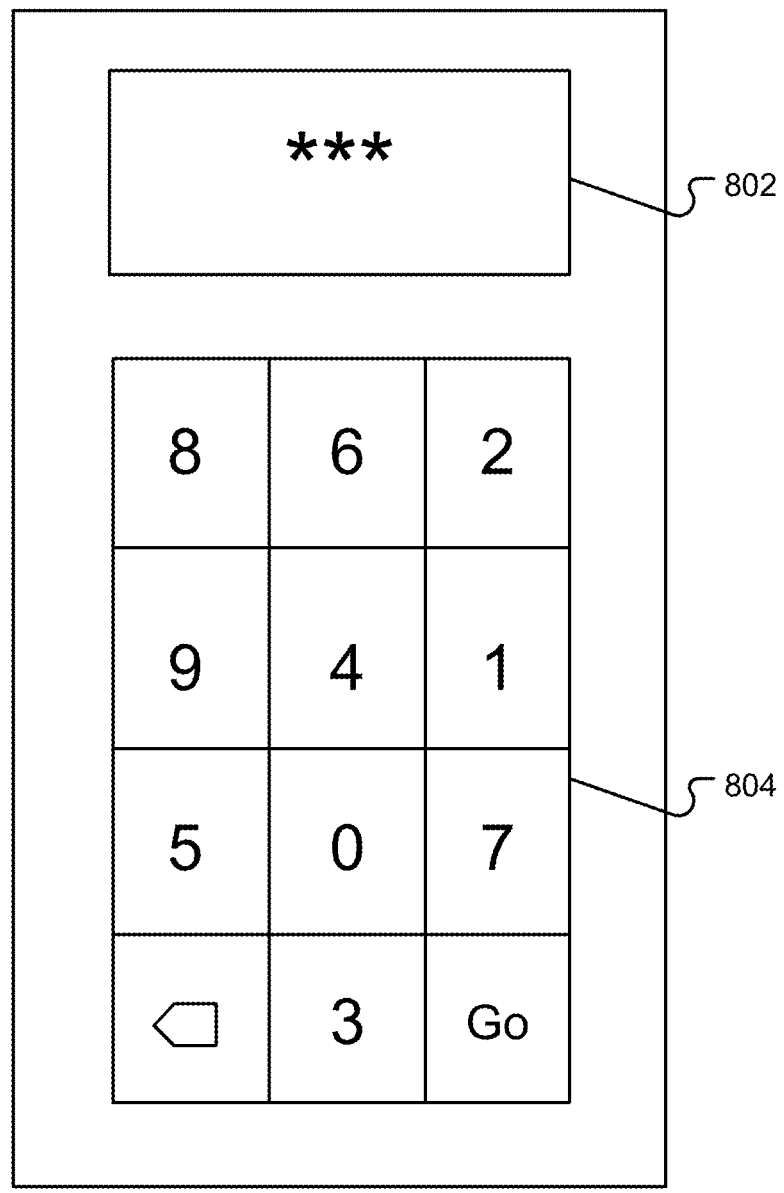
FIG. 8 is an example generated user interface on a mobile device.

FIG. 8 is an example generated user interface 800 on a mobile device. The user interface displays a keypad 804 and a passcode field 802. A typical keypad can display input values 1, 2, 3, 4, 5, 6, 7, 8, 9, and 0 in ascending order from left to right and top to bottom. Here, locations of input values of the keypad are randomly generated. More specifically, the order of input values, from left to right and top to bottom, is 8, 6, 2, 9, 4, 1, 5, 0, 7, and 3. Alternatively, instead of randomly assigning locations, the user interface can be selected from a number of predetermined user interfaces.

If a user taps a middle cell with value '4', the mobile device can encrypt and send the location of the tap to the secure server. In some implementations, an input location is sent after each user input. In alternative implementations, user input locations are aggregated and sent after a user hits a 'Go' value.

The secure server can match the location of the tap, e.g., the x-coordinate and the y-coordinate, to locations of input values of the generated keypad. That is, the secure server can determine the value of the passcode is '4' because the location of the user input is within a location of the '4' in the generated keypad. In general, the secure server returns the passcode after all of the user input locations are received.

Figure 9:
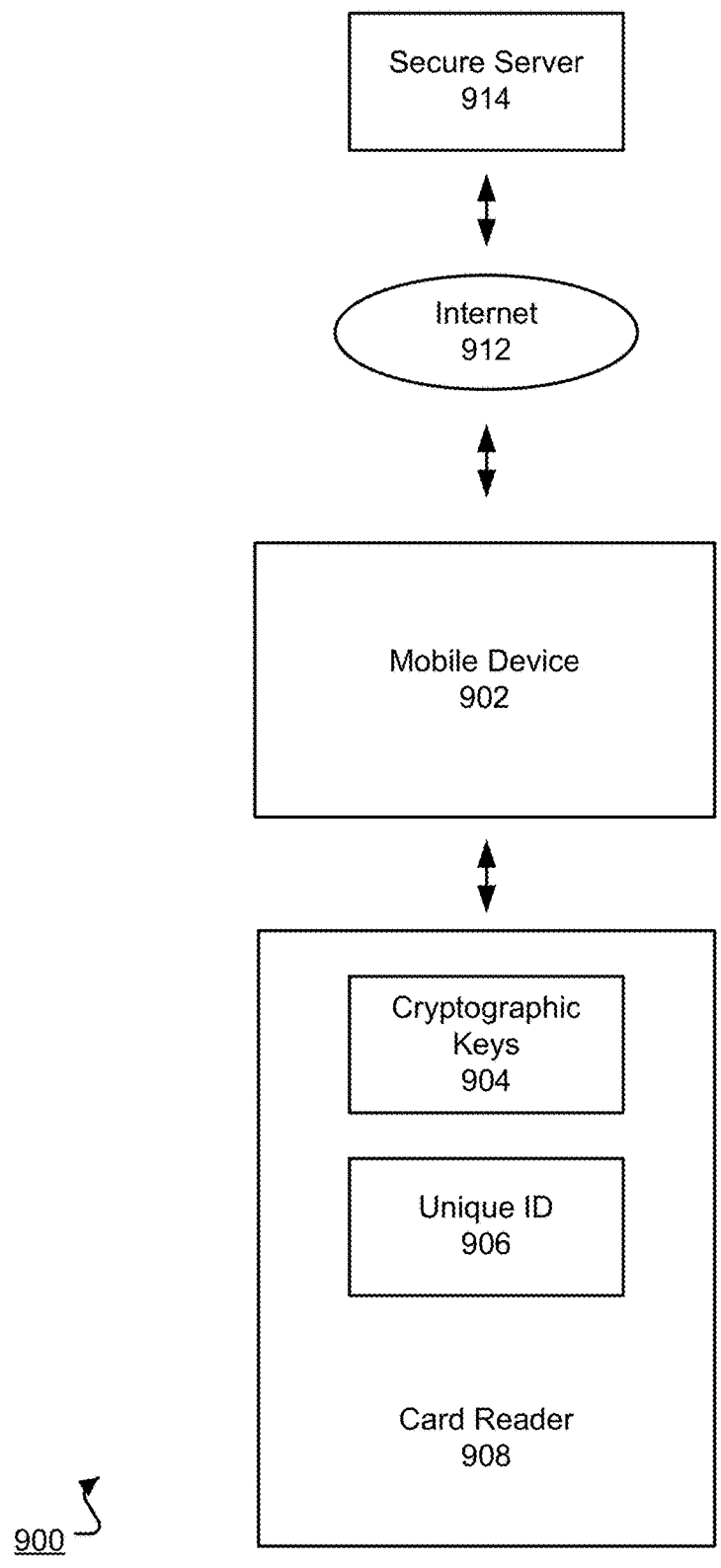
FIG. 9 is a schematic illustration of an example system for securely communicating between a card reader and a mobile device.

FIG. 9 is a schematic illustration of an example system 900 for securely communicating between a card reader 908 and a mobile device 902. The card reader includes cryptographic keys 904 and a unique identification (ID) 906. The cryptographic keys 904 can include a public key and a private key. The cryptographic keys 904 can also include a certificate signed by a trusted authority. The unique ID 906 is an identification that is unique to the card reader. The unique ID can be 32 bits or 64 bits in length. In some implementations, the unique ID 906 is embedded in firmware during manufacture of the card reader 908. The card reader 908 communicates with the mobile device 902, which can communicate with a secure server 914 over an external network, e.g., the Internet 912. The secure server 914 can provide a public key for secure communication between the mobile device 902 and the card reader 908, as will be described further below in reference to FIG. 10.

Figure 10:
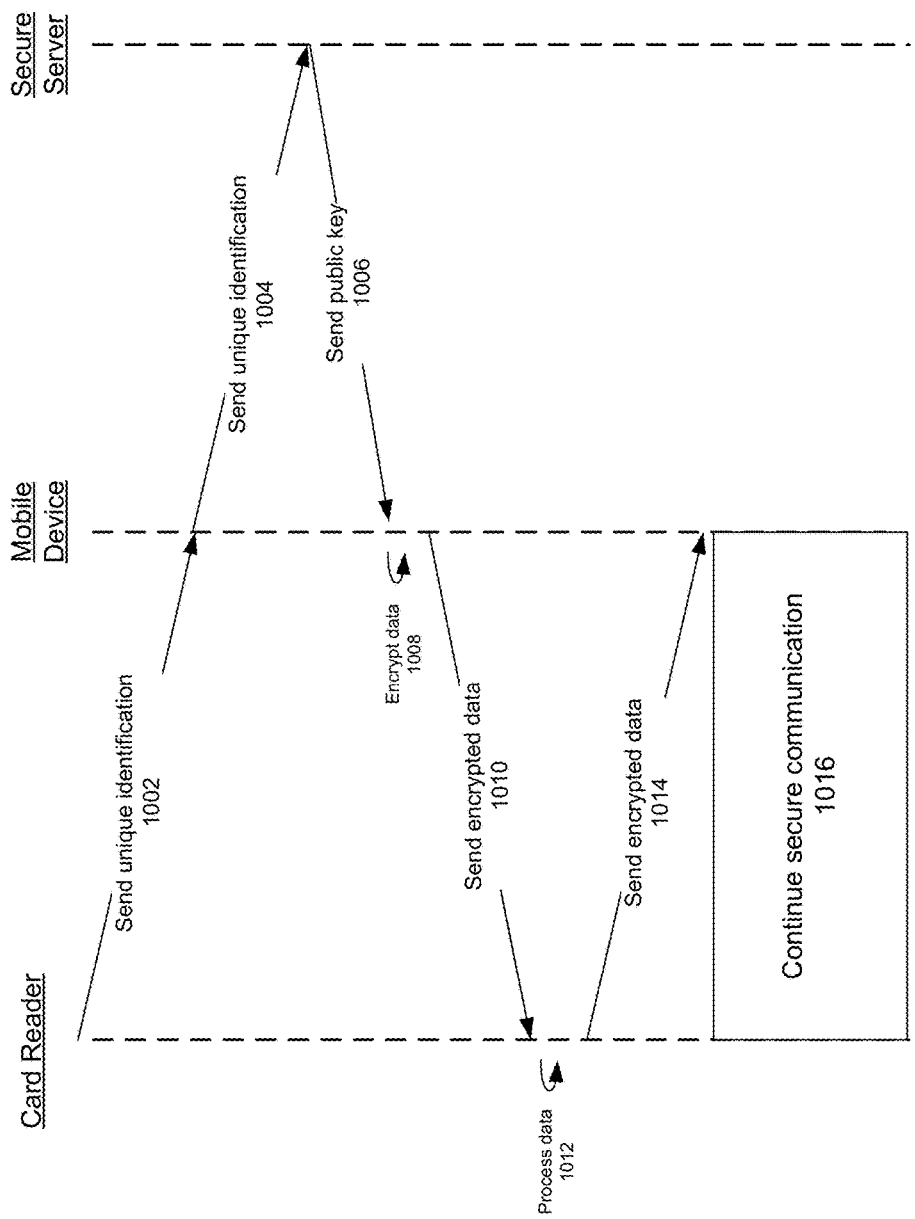
FIG. 10 is a diagram of an example method of establishing secure communications between a card reader and a mobile device using asymmetric encryption.

FIG. 10 is a diagram of an example method 1000 of establishing secure communications between a card reader and a mobile device using asymmetric encryption. The card reader sends a unique ID to the mobile device (step 1002). In some implementations, the card reader sends, to the mobile device, a certificate signed by a trusted authority. The mobile device can verify the certificate's signature. Alternatively, the mobile device can send the certificate to a secure server for verification.

In some implementations, the mobile device does not have a cryptographic key, e.g., a public key, corresponding to a cryptographic key on the card reader, e.g., a corresponding private key. Therefore, the mobile device can obtain the appropriate cryptographic key from the secure server.

The mobile device sends the unique ID to the secure server (step 1004), e.g., using a data connection such as 3G/4G or WiFi. The secure server receives the unique ID and obtains a public cryptographic key associated with the unique ID, e.g., from a database. The public key can expire after a certain amount of time. In some implementations, the secure server stops secure communication between the mobile device and card reader by allowing the public key to expire without reissuing another valid public key.

The secure server sends the public key to the mobile device (step 1006). The mobile device can then cache the public key for future communications with the card reader. The mobile device can encrypt data using the public key (step 1008). For example, using the public key, the mobile device can encrypt a request to the card reader to accept a card for a payment transaction. Alternatively, the mobile device can encrypt a PIN entered by the user using the public key.

The mobile device sends encrypted data to the card reader (step 1010). To process the data, the card reader uses a private cryptographic key to decrypt the encrypted data and performs operations based on the data (step 1012). For example, the card reader can decrypt a request to compare PIN values and perform a comparison using the decrypted data. The private key can be embedded in the card reader during manufacturing. In some implementations, the card reader only responds to requests that are encrypted by the public key.

The card reader can encrypt a response to the mobile device using the private key and send encrypted data to the mobile device (step 1014). For example, the response can be an acknowledgement that the card reader has verified a PIN match. The mobile device can decrypt the response using the mobile device's public key and perform operations based on the data, e.g., submit an authorization for transaction to a payment processing server. In this manner, the mobile device and card reader can continue to securely communicate using the mobile device's public key and the card reader's private key (step 1016).

In some implementations, when securely communicating using either asymmetric or symmetric encryption, the secure server and the mobile device each have a separate pair of cryptographic keys, e.g., separate pairs of public and private keys. The mobile device and secure server can add an additional layer of security by encrypting data, which can be already encrypted using the card reader's private key, using the appropriate public key. For example, the mobile device can encrypt the unique identification of the card reader before transmission to the server. The server can first decrypt the received data from the mobile device using the server's separate private key. The server can also encrypt data, e.g., the card reader's public key, that is sent to the mobile device using the mobile device's separate public key.

In some implementations, secure communication can be established without the secure server. Instead of sending the unique ID to the mobile device, the card reader sends a cryptographic key, e.g., the card reader's public key, to the mobile device. Generally, public keys are 2048 bits long, the size of which is significantly larger than the size of a unique ID. Therefore, the time and battery requirements for the card reader to send the public key to the mobile device are higher than the card reader's sending of the unique ID. However, once the mobile device receives the public key in its entirety, the mobile device can securely communicate with the card reader as described above.

Figure 11:
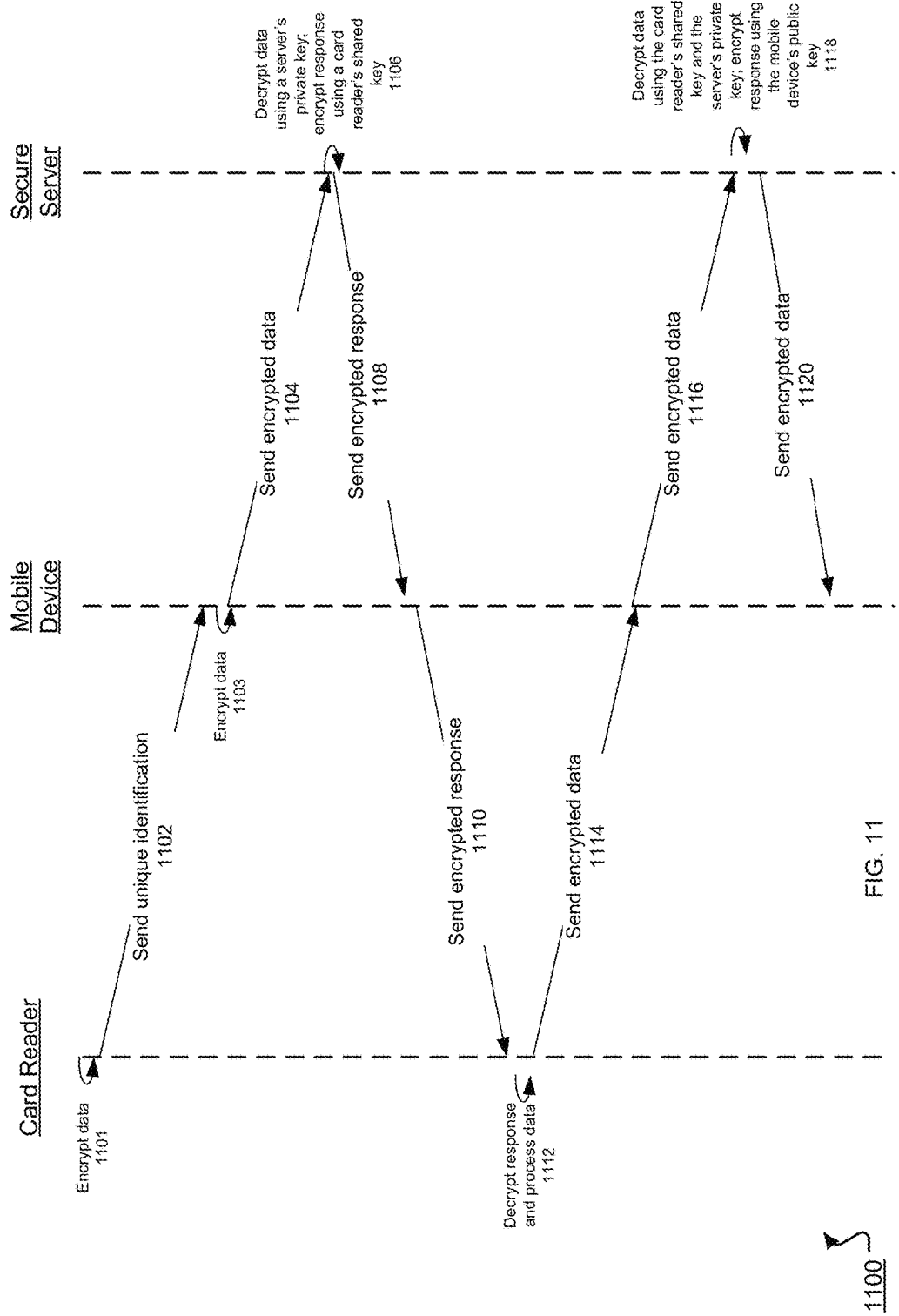
FIG. 11 is a diagram of an example method 1100 of establishing secure communications between a card reader and a mobile device using symmetric encryption.

FIG. 11 is a diagram of an example method 1100 of establishing secure communications between a card reader and a mobile device using symmetric encryption. The card reader encrypts a unique identification of the card reader using a cryptographic key, e.g., a shared key (step 1101). Similar to the method describe above using asymmetric encryption, the card reader sends the encrypted unique ID to the mobile device (step 1102). The unique ID can be 32 bits or 64 bits in length. In some implementations, the card reader sends, to the mobile device, a certificate signed by a trusted authority. The mobile device can verify the certificate's signature. Alternatively, the mobile device can send the certificate to a secure server for verification.

The mobile device generates data to be sent to the card reader (step 1103). For example, the data can be a passcode, e.g., a PIN corresponding to a credit card. For example, without the shared key, the mobile device cannot encrypt data to be sent to the card reader. In some implementations, the mobile device uses a separate pair of cryptographic keys, as described above, to securely communicate with a server. The mobile device can generate encrypted data using the mobile device's public key (step 1104). The encrypted data can include an encrypted version of the unique identification and an encrypted version of a request for the card reader to process, e.g., a request to process a PIN.

The mobile device sends encrypted data to the secure server 1104, e.g., using a data connection such as 3G/4G or WiFi. In some implementations, the secure server receives the encrypted data and decrypts the encrypted data using its separate private key. The decrypted data can include an unencrypted ID and an unencrypted request. With an unencrypted ID, the secure server can obtain a shared key associated with the unique ID, e.g., from a database. The secure server can generate a response that is encrypted with the request using the shared key (step 1106). The secure server sends the encrypted response to the mobile device (step 1108).

In turn, the mobile device sends the encrypted response to the card reader (step 1110). The mobile device does not receive the shared key and therefore minimizes a security breach. To process the data, the card reader uses the shared key, which can be embedded during manufacturing, to decrypt the encrypted response and performs operations based on the data (step 1112). For example, the card reader can decrypt a request to compare PIN values and perform a comparison using the decrypted data. In some implementations, the card reader only responds to requests that are encrypted by the shared key.

The card reader can encrypt more data to send to the mobile device using the shared key and send the encrypted data to the mobile device (step 1114). For example, the data can be an acknowledgement that the card reader has verified a PIN match. The mobile device sends the encrypted data to the secure server (step 1116). In some implementations, the mobile device encrypts the encrypted data a second time using the secure server's public key. Upon receipt of the encrypted data, the secure server decrypts the data using the secure server's private key and the card reader's shared key to obtain unencrypted data from the card reader. The secure server then encrypts the data using the mobile device's public key (step 1118). The secure server sends the encrypted data to the mobile device (step 1120), and the mobile device decrypts the data using its separate private key and processes the data. Secure communication can continue without the mobile device ever having the card reader's shared key.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described. Other embodiments are within the scope of the following claims. For example, usage of wireless payment system may not be limited to a taxi environment but could also be applied to other environments, such as a restaurant. Moreover, usage of the techniques to establish secure communication may not be limited to mobile devices, but could also be applied to non-mobile or wired devices connected to a network. Although the swiping of a card through a reader is described above, other techniques for scanning a card, e.g., chip reading or near field communication, could be used to read data from the card.

What is claimed is:

1. A method of securely communicating between a card reader and a mobile device, the method comprising:
    receiving, by the mobile device that is associated with a merchant and from the card reader, an identification code that identifies the card reader, wherein the card reader is configured to read card information of a payment card used for payment of a transaction between the merchant associated with the mobile device and a cardholder associated with the payment card;
    sending, by the mobile device, the identification code to a server;
    receiving, by the server, the identification code;
    obtaining, by the server, a cryptographic key associated with the identification code;
    sending, by the server, the cryptographic key associated with the identification code to the mobile device;
    receiving, by the mobile device and from the server, the cryptographic key that is associated with the identification code;
    storing, by the mobile device, the cryptographic key on the mobile device for use by the mobile device for encrypting communications of the mobile device with the card reader;
    encrypting, by the mobile device, a first data including a passcode associated with the payment card entered by the cardholder on an interface of the mobile device using the stored cryptographic key received from the server;
    sending, by the mobile device, the encrypted first data to the card reader to prompt the card reader to perform a first operation based on the first data, the first operation including verifying whether the passcode of the decrypted data matches a second passcode embedded in the payment card;
    receiving, by the mobile device, encrypted second data from the card reader;
    decrypting, by the mobile device, the encrypted second data using the stored cryptographic key received from the server;
    processing, by the mobile device, the unencrypted second data; and
    performing, by the mobile device, a second operation based on the unencrypted second data that includes sending a payment transaction, including a payment amount of the transaction, to a payment processing system.

2. The method of claim 1, where the identification code is thirty two bits or sixty four bits in length.

3. The method of claim 1, where prior to receiving the identification code, the card reader acquires information from the payment card.

4. The method of claim 3, where the stored cryptographic key received by the mobile device from the server expires after a predetermined amount of time.

5. The method of claim 1, where the second encrypted data indicates an acknowledgment that the passcode has been verified by the card reader.

6. The method of claim 1, where prior to the encrypting, further comprising:
receiving, by the mobile device, a certificate from the card reader;
sending, by the mobile device, the certificate to the server to prompt verification of a signature of the certificate by the server; and
receiving, by the mobile device, a verification of the certificate from the server.

7. The method of claim 1, where prior to sending the identification code to the server, encrypting, by the mobile device, the identification code using a public key acquired from the server; and where decrypting the encrypted data using the stored cryptographic key comprises decrypting, by the mobile device, the encrypted second data using a private key associated with the mobile device.

8. The method of claim 1, where the identification code and the encrypted second data are received from the card reader via an audio jack of the mobile device, and where the first data is sent by the mobile device to the card reader via the audio jack.

9. The method of claim 1, where the identification code and the encrypted second data are received wirelessly from the card reader, and where the first data is sent wirelessly by the mobile device to the card reader.

10. A method of securely communicating between a card reader and a mobile device, the method comprising:
sending, by the card reader, an identification code that identifies the card reader to the mobile device, wherein the card reader is configured to read card information of a payment card used for payment of a transaction between a merchant associated with the mobile device and a cardholder associated with the payment card;
receiving, by the card reader, encrypted data from the mobile device including a first passcode associated with the payment card, the encrypted data being encrypted by the mobile device using a first cryptographic key that is associated with the identification code and that has been received by the mobile device from a server based on the identification code;
decrypting, by the card reader, the encrypted data using a second cryptographic key embedded in the card reader, to produce decrypted data;
performing, by the card reader, a first operation based on the decrypted data including verifying whether the passcode of the decrypted data matches a second passcode embedded in the payment card;
encrypting, by the card reader, a response using the second cryptographic key, the response including information indicating whether the first passcode matches the second passcode; and
sending, by the card reader, the encrypted response to the mobile device to prompt the mobile device to perform a second operation based on the response that includes sending a payment transaction, including a payment amount of the transaction, to a payment processing system.

11. The method of claim 10, where the identification code is 32 bits or 64 bits in length.

12. The method of claim 10, where prior to sending the identification code, the card reader acquires information from the payment card.

13. The method of claim 12, where the first cryptographic key received by the mobile device from the server expires after a predetermined amount of time.

14. The method of claim 10, further comprising: sending, by the card reader, a certificate to the mobile device.

15. The method of claim 10, where the second cryptographic key is embedded in the card reader during manufacturing of the card reader.

16. The method of claim 10, where the identification code and the response are sent by the card reader to the mobile device via an audio jack of the mobile device, and where the encrypted data is received by the card reader via the audio jack.

17. The method of claim 10, where the identification code and the response are sent wirelessly by the card reader, and where the encrypted data is received wirelessly by the card reader.

18. A method of securely communicating between a card reader and a mobile device, the method comprising:
receiving, by the mobile device, from the card reader, an identification code that identifies the card reader, wherein the card reader is configured to read card information of a payment card used for payment of a transaction between a merchant associated with the mobile device and a cardholder associated with the payment card;
generating, by the mobile device, first data including the identification code received from the card reader, wherein the first data is encrypted using a first cryptographic key that is retrieved from a server;
sending, by the mobile device, the encrypted first data to the server, where the server conducts operations that further comprise:
decrypting the encrypted first data using a second cryptographic key that is associated with the first cryptographic key;
obtaining a third cryptographic key based on the identification code from a database that maps identification codes to cryptographic keys, wherein the third cryptographic key is linked to the identification code of the card reader;
encrypting the third cryptographic key using the second cryptographic key; and
sending the encrypted third cryptographic key to the mobile device;
receiving, by the mobile device, the encrypted the third cryptographic key from the server;
decrypting, by the mobile device, the encrypted third cryptographic key using the first cryptographic key;
storing, by the mobile device, the third cryptographic key on the mobile device;
encrypting, by the mobile device, using the stored third cryptographic key, second data including a passcode entered by the cardholder on an interface of the mobile device;
sending, by the mobile device, the encrypted second data to the card reader to prompt the card reader to perform an operation;

receiving an encrypted verification result, by the mobile device, from the card reader; and decrypting, by mobile device, using the stored third cryptographic key, the encrypted verification result to obtain a decrypted verification result indicating whether the passcode entered by the cardholder on the interface of the mobile device is valid.

19. The method of claim 18, where the identification code is thirty two bits or sixty four bits in length.

20. The method of claim 18, where prior to the mobile device receiving the identification code, the card reader acquires information from the payment card.

21. The method of claim 18, where the encrypted verification result received by the mobile device from the card reader is encrypted by the card reader using an embedded encryption key corresponding to the stored third encryption key, and the decrypted verification result includes an acknowledgment that the entered passcode matches a passcode embedded on the payment card.

22. The method of claim 18, where prior to sending the encrypted first data to the server, the method further comprising:

receiving, by the mobile device, a certificate from the card reader;

sending, by the mobile device, the certificate to the server, where the server verifies a signature of the certificate; and receiving, by the mobile device, a verification of the certificate from the server.

23. The method of claim 18, further comprising:

submitting, by the mobile device, a payment transaction to a payment processing system based on the decrypted verification result.

24. The method of claim 18, where the identification code is received from the card reader via an audio jack of the mobile device, and where the encrypted second data is sent by the mobile device to the card reader via the audio jack.

25. The method of claim 18, where the identification code is received wirelessly from the card reader, and where the encrypted second data is sent wirelessly by the mobile device to the card reader.

26. A method of securely communicating between a card reader and a mobile device, the method comprising:

sending, by the card reader, an identification code that identifies the card reader to the mobile device and that is embedded within firmware in the card reader during manufacturing of the card reader, wherein the card reader is configured to read card information of a payment card used for payment of a transaction between a merchant associated with the mobile device and a cardholder associated with the payment card;

receiving, by the card reader, encrypted data from the mobile device, the encrypted data being encrypted by the mobile device using a first cryptographic key that is associated with the identification code of the card reader, wherein the first cryptographic key is received from a server by the mobile device based on the identification code of the card reader and stored on the mobile device;

decrypting, by the card reader, the encrypted data using a second cryptographic key associated with the first cryptographic key and that is embedded in the card reader to produce decrypted data;

performing, by the card reader, a first operation based on the decrypted data;

encrypting, by the card reader, a response using the second cryptographic key; and sending, by the card reader, the response to the mobile device to prompt the mobile device to perform a second operation.

27. The method of claim 26, where the identification code is 32 bits or 64 bits in length.

28. The method of claim 26, where prior to sending the identification code, the card reader acquires information from the payment card.

29. The method of claim 26, where the encrypted data includes a passcode associated with the payment card that is entered using an interface of the mobile device.

30. The method of claim 29, where the response is an acknowledgment that the passcode has been verified by the card reader as matching an embedded passcode within the payment card.

31. The method of claim 26, where the identification code and the response are sent by the card reader to the mobile device via an audio jack of the mobile device, and where the encrypted data is received by the card reader via the audio jack.

32. The method of claim 26, where the identification code and the response are sent wirelessly, and where the encrypted data is received wirelessly.

33. A method of securely communicating between a card reader and a mobile device, the method comprising:

sending, by the mobile device, an identification code that identifies the card reader to a server, wherein the card reader is configured to read card information of a payment card used for payment of a transaction between a merchant associated with the mobile device and a cardholder associated with the payment card;

receiving, by the mobile device, from the server, a cryptographic key that is associated with the identification code of the card reader;

storing, by the mobile device, the cryptographic key on the mobile device for encrypting communications with the card reader;

encrypting, by the mobile device, using the stored cryptographic key, first data acquired by the mobile device;

sending, by the mobile device, the encrypted first data to the card reader to prompt the card reader to perform a first operation based on the encrypted first data;

receiving, by the mobile device, encrypted second data from the card reader;

decrypting, by the mobile device, the encrypted second data using the stored cryptographic key received from the server to produce decrypted second data;

determining a verification result, by the mobile device, based on the decrypted second data indicating whether a passcode entered by the cardholder on an interface of the mobile device is valid; and sending, by the mobile device, based on the verification result, a payment transaction, including a payment amount of the transaction, to a payment processing system.

34. The method of claim 33, where prior to the mobile device receiving the cryptographic key, the card reader acquires information from the payment card.

35. The method of claim 34, further comprising:

encrypting, by the mobile device, as the first encrypted data, the passcode entered by the cardholder on the interface of the mobile device using the stored cryptographic key; and sending, by the mobile device, as the first encrypted data, the encrypted passcode to the card reader to prompt the card reader to verify whether the passcode matches a passcode embedded on the payment card.

36. The method of claim 35, where the verification result determined by the mobile device is received from the card reader as the encrypted second data, and includes an acknowledgment that the passcode has been verified by the card reader.

37. The method of claim 33, where prior to the encrypting the first data, the method further comprising:
receiving, by the mobile device, a certificate from the card reader;
sending, by the mobile device, the certificate to the server to prompt verification of a signature of the certificate; and
receiving, by the mobile device, a verification of the certificate from the server.

38. The method of claim 33, where the encrypted second data is received from the card reader via an audio jack of the mobile device, and where the encrypted first data is sent by the mobile device to the card reader via the audio jack.

39. The method of claim 33, where the cryptographic key and the encrypted second data are received wirelessly, and where the encrypted first data is sent wirelessly.

40. A method of securely communicating between a card reader and a mobile device, the method comprising:
receiving, by the card reader, at a card interface, a read of a payment card, wherein the card reader is configured to read card information of the payment card used for payment of a transaction between a merchant associated with the mobile device and a cardholder associated with the payment card;
responsive to receiving the read of the card, sending, by the card reader, a card reader identification code to the mobile device, the identification code enabling the mobile device to receive, from a server, and store a first cryptographic key being a public key that is associated with the card reader;
receiving, by the card reader, encrypted data from the mobile device that has been encrypted by the mobile device using the stored first cryptographic key;
decrypting, by the card reader, the encrypted data using a second cryptographic key associated with the first cryptographic key to produce decrypted data;
performing, by the card reader, a first operation based on the decrypted data;
encrypting, by the card reader, a response using the second cryptographic key; and
sending, by the card reader, the response to the mobile device to prompt the mobile device to perform a second operation based on the response that includes sending a payment transaction, including a payment amount of the transaction, to a payment processing system.

41. The method of claim 40, where the encrypted data includes a passcode associated with the card.

42. The method of claim 41, where the response is an acknowledgment that the passcode has been verified by the card reader.

43. The method of claim 40, where the identification code and the response are sent by the card reader to the mobile device via an audio jack of the mobile device, and where the encrypted data is received by the card reader via the audio jack.

44. The method of claim 40, where the identification code and the response are sent wirelessly by the card reader, and where the encrypted data is received wirelessly.

45. A method of processing payment transactions between a card, a card reader and a mobile device, the method comprising:
receiving, by the card reader at a card interface, an insertion of a payment card, of a card holder, used for payment of a transaction between a merchant associated with the mobile device and the cardholder;
sending, by the card reader, a notification of the insertion to the mobile device;
receiving, by the card reader, batched information associated with the payment card from the mobile device, where the batched information includes transaction details and a passcode for the card, where the batched information is encrypted by the mobile device using a first cryptographic key associated with the card reader, wherein the mobile device receives and stores the first cryptographic key from a server based on an identification code of the card reader, and wherein the mobile device receives the passcode based on user input on a display of the mobile device;
decrypting, by the card reader, the batched information using a second cryptographic key embedded within the card reader;
storing, by the card reader, the batched information within a memory, wherein the batched information includes the transaction details including at least one of an amount of the transaction or an identity of a payee;
sending, by the card reader, the passcode to the payment card, where the payment card determines whether the passcode matches an embedded passcode in the payment card; and
in response to the card determining the passcode matches the embedded passcode in the card,
processing, by the card reader, the transaction details; and
sending, by the card reader, an approval for a transaction to the mobile device.

46. The method of claim 45, where the notification and the approval are sent by the card reader to the mobile device via an audio jack of the mobile device, and where the passcode is received by the card reader via the audio jack.

47. The method of claim 45, where the notification and the approval are sent wirelessly by the card reader, and where the passcode is received wirelessly.

48. The method of claim 45, where the passcode is encrypted by the mobile device using the stored first cryptographic key, and where the method comprises, prior to sending the passcode to the payment card, decrypting the encrypted passcode using the second cryptographic key.

49. The method of claim 45, where the approval is encrypted, by the card reader using the second cryptographic key.

* * * * *